US009840971B2

(12) United States Patent
Glugla et al.

(10) Patent No.: US 9,840,971 B2
(45) Date of Patent: Dec. 12, 2017

(54) VARIABLE DISPLACEMENT ENGINE CONTROL SYSTEM AND METHOD

(71) Applicant: Ford Global Technologies, LLC, Dearborn, MI (US)

(72) Inventors: Chris Paul Glugla, Macomb, MI (US); Steven Schwochert, Garden City, MI (US); Ken Jahr, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1145 days.

(21) Appl. No.: 13/968,240

(22) Filed: Aug. 15, 2013

(65) Prior Publication Data

US 2015/0051809 A1 Feb. 19, 2015

(51) Int. Cl.
*F02D 41/00* (2006.01)
*F02D 41/02* (2006.01)
*F02D 41/40* (2006.01)
*F02D 17/02* (2006.01)
*F02D 43/00* (2006.01)
(Continued)

(52) U.S. Cl.
CPC ........... *F02D 17/02* (2013.01); *F02D 41/005* (2013.01); *F02D 41/0025* (2013.01); *F02D 41/0087* (2013.01); *F02D 41/0245* (2013.01); *F02D 41/3836* (2013.01); *F02D 41/402* (2013.01); *F02D 43/00* (2013.01); *F02P 5/1512* (2013.01); *F02D 41/064* (2013.01); *F02D 2200/021* (2013.01); *F02D 2200/0802* (2013.01);
(Continued)

(58) Field of Classification Search
CPC ............... F02D 41/0047; F02D 41/005; F02D 41/0055; F02D 41/0057; F02D 41/0087; F02D 41/0235; F02D 41/024; F02D 41/0245; F02D 41/0255
See application file for complete search history.

(56) References Cited

U.S. PATENT DOCUMENTS 5,617,829 A 4/1997 Bidner et al.
6,041,591 A * 3/2000 Kaneko ................. F02D 41/024
123/300
(Continued)

FOREIGN PATENT DOCUMENTS

CN 101429916 A 5/2009
EP 0555851 A2 8/1993
JP 2009115094 A 5/2009

OTHER PUBLICATIONS

Glugla, Chris Paul et al., "Variable Displacement Engine Control System and Method," U.S. Appl. No. 13/896,059, filed May 16, 2013, 36 pages.
(Continued)

*Primary Examiner* — Hieu T Vo
*Assistant Examiner* — Arnold Castro
(74) *Attorney, Agent, or Firm* — Julia Voutyras; McCoy Russell LLP

(57) ABSTRACT

Methods and systems are provided for improving the performance of a variable displacement engine. Split injection and spark retard may be used in active cylinder during a VDE mode to heat an exhaust catalyst and extend the duration of VDE mode operation. Split injection and spark retard may also be used in reactivated cylinders at a time of cylinder reactivation to improve restart combustion stability.

18 Claims, 9 Drawing Sheets

(51) Int. Cl.
*F02D 41/38* (2006.01)
*F02P 5/15* (2006.01)
*F02D 41/06* (2006.01)

(52) U.S. Cl.
CPC .............. *Y02T 10/26* (2013.01); *Y02T 10/44* (2013.01); *Y02T 10/46* (2013.01); *Y02T 10/47* (2013.01)

(56) References Cited

U.S. PATENT DOCUMENTS

| | | | |
|---|---|---|---|
| 6,382,177 B1* | 5/2002 | Saito | F02D 41/402 123/299 |
| 6,415,601 B1 | 7/2002 | Glugla et al. | |
| 6,466,449 B1 | 10/2002 | Sheen et al. | |
| 6,739,123 B2 | 5/2004 | Glugla et al. | |
| 7,225,782 B2 | 6/2007 | Pallett et al. | |
| 7,255,080 B1 | 8/2007 | Leone | |
| 9,284,909 B2* | 3/2016 | Wooldridge | F02D 43/00 |
| 9,429,081 B2* | 8/2016 | Moscherosch | F02D 17/02 |
| 2002/0194837 A1* | 12/2002 | Fluga | F01N 3/2006 60/284 |
| 2004/0020190 A1* | 2/2004 | Yoshida | F02D 37/02 60/286 |
| 2005/0027431 A1* | 2/2005 | Todoroki | F01N 3/0821 701/105 |
| 2006/0169245 A1* | 8/2006 | Zillmer | B60K 6/48 123/299 |
| 2008/0196696 A1* | 8/2008 | Storhok | F02D 41/064 123/491 |
| 2009/0056316 A1* | 3/2009 | Haseyama | B01D 53/944 60/286 |
| 2010/0212295 A1* | 8/2010 | Narayanaswamy | F02D 41/0235 60/285 |
| 2010/0294236 A1 | 11/2010 | Surnilla et al. | |
| 2011/0106392 A1* | 5/2011 | Verner | F01N 3/101 701/101 |
| 2011/0155097 A1* | 6/2011 | Matsumura | F02D 41/401 123/299 |
| 2011/0162620 A1 | 7/2011 | Bidner et al. | |
| 2011/0184629 A1 | 7/2011 | Krengel et al. | |
| 2011/0209685 A1* | 9/2011 | Shane | F02D 41/0002 123/299 |
| 2011/0265454 A1* | 11/2011 | Smith | F01N 3/0842 60/274 |
| 2012/0022771 A1* | 1/2012 | Kita | F02D 41/32 701/104 |
| 2012/0285161 A1 | 11/2012 | Kerns et al. | |
| 2013/0008416 A1* | 1/2013 | Nagatsu | F02D 13/0265 123/568.11 |
| 2013/0245920 A1* | 9/2013 | Vos | F02D 41/1443 701/104 |
| 2013/0269317 A1* | 10/2013 | Narayanaswamy | F01N 3/20 60/274 |
| 2014/0000552 A1* | 1/2014 | Glugla | F02D 43/00 123/295 |
| 2014/0000557 A1* | 1/2014 | Glugla | F02D 41/008 123/435 |
| 2014/0090360 A1* | 4/2014 | Wilson | F01N 3/208 60/274 |
| 2014/0297162 A1* | 10/2014 | Surnilla | F02D 41/3094 701/104 |
| 2015/0051816 A1* | 2/2015 | Glugla | F02D 41/0055 701/108 |
| 2015/0252743 A1* | 9/2015 | Glugla | F02D 41/1498 701/104 |
| 2015/0345407 A1* | 12/2015 | Glugla | F02D 17/02 123/403 |

OTHER PUBLICATIONS

Glugla, Chris Paul et al., "System and Method for Providing Spark to an Engine," U.S. Appl. No. 13/867,539, filed Apr. 22, 2013, 36 pages.

Theis, Joseph Robert et al., "NOx Control During Engine Idle-Stop Operations," U.S. Appl. No. 13/565,454, filed Aug. 2, 2012, 62 pages.

Kerns, James Michael et al., "NOx Control During Cylinder Deactivation" U.S. Appl. No. 13/565,490, filed Aug. 2, 2012, 62 pages.

Glugla, Chris Paul et al., "Method for Purging Condensate from a Charge Air Cooler," U.S. Appl. No. 13/904,839, filed May 29, 2013, 63 pages.

Glugla, Chris Paul et al., "Method for Purging Condensate from a Charge Air Cooler," U.S. Appl. No. 13/904,875, filed May 29, 2013, 61 pages.

Glugla, Chris Paul et al., "Variable Displacement Engine Control System and Method," U.S. Appl. No. 13/968,252, filed Aug. 15, 2013, 67 pages.

State Intellectual Property Office of the People's Republic of China, Office Action and Search Report Issued in Application No. 201410163672.4, dated Aug. 29, 2017, 8 pages. (Submitted with Partial Translation).

* cited by examiner

VARIABLE DISPLACEMENT ENGINE CONTROL SYSTEM AND METHOD

FIELD

The present application relates to adjusting fuel injection strategy when operating in or transitioning between modes in a variable displacement internal combustion engine (VDE).

BACKGROUND AND SUMMARY

Engines may be configured to operate with a variable number of active or deactivated cylinders to increase fuel economy, while optionally maintaining the overall exhaust mixture air-fuel ratio about stoichiometry. Such engines are known as variable displacement engines (VDE). In some examples, a portion of an engine's cylinders may be disabled during selected conditions, where the selected conditions can be defined by parameters such as a speed/load window, as well as various other operating conditions including vehicle speed. A VDE control system may disable selected cylinders through the control of a plurality of cylinder valve deactivators that affect the operation of the cylinder's intake and exhaust valves, or through the control of a plurality of selectively deactivatable fuel injectors that affect cylinder fueling. When transitioning between a VDE mode (where one or more cylinders are deactivated) and a non-VDE mode (where all the cylinders are active), the control system may adjust one or more engine operating parameters to reduce disturbances (e.g., torque disturbances) and attenuate the disturbance during the transition.

One example approach for engine control during a VDE transition is shown by Pallett et al in U.S. Pat. No. 7,225,782. Therein, the VDE engine is coupled in a hybrid electric vehicle having an electric motor. When enabling or disabling a cylinder, torque from the motor is varied to compensate for transient changes in engine output torque caused by the enabling or disabling of the cylinder. In particular, the electric motor is controlled to mask any drivability issues associated with VDE transitions and/or poor combustion stability.

However the inventors herein have identified potential issues with such an approach. As one example, combustion stability may be degraded during the transition. Specifically, when transitioning from the VDE mode (or partial cylinder mode) to the non-VDE mode (or full cylinder mode), cylinder load decreases based on the decrease in aircharge. The lighter cylinder loads generally have less stable combustion and the interaction with the transient fuel compensation, and other cylinder conditions that are different than the operating cylinders due to cooling during deactivation, may contribute to less stable combustion during reactivation. If the engine is equipped for exhaust gas recirculation, EGR control used during the transition may exacerbate the combustion issues. In particular, the EGR may continue to interfere with the lighter cylinder load until the EGR delivered to the cylinders has been sufficiently bled down to reduce combustion issues. In some embodiments, charge motion control valves (CMCVs) may be used to adjust the in-cylinder motion of the air-fuel mixture delivered to the cylinder during the transition. High in-cylinder motion results in better mixing, and more stable combustion. However, due to the slow response time of the CMCV (e.g., the CMCV not shutting quickly enough when transitioning to the lower cylinder load), combustion stability may be compromised. The poor combustion conditions can also lead to slow burns or even misfires. Overall, combustion stability and engine performance may be degraded.

In one example, some of the above issues may be at least partly addressed by a method for an engine comprising: selectively deactivating one or more engine cylinders responsive to operating conditions, and during reactivation of the cylinders, operating the reactivated cylinders with split fuel injection. Specifically, the fuel injection of the reactivated cylinders may be transiently shifted to each of an intake stroke and a compression stroke injection for a number of combustion events. In this way, restart combustion stability is improved and torque disturbances during a transition out of a VDE mode of operation are reduced.

In one example, a variable displacement engine may be configured with selectively deactivatable fuel injectors. In response to selected deactivation conditions, such as reduced engine load or torque demand, one or more cylinders may be deactivated and the engine may be operated in a VDE mode. For example, the engine may be operated with half the cylinders deactivated and with the remaining active cylinders operating at a higher cylinder load. During the deactivation, the active cylinders may be operated with fuel delivered as a single intake stroke injection. In addition, due to the higher average cylinder load, the cylinders may be operable with EGR without incurring combustion stability issues otherwise incurred at low engine loads. The use of EGR during VDE operation provides additional fuel economy benefits.

In response to reactivation conditions, such as increased engine load or torque demand, the deactivated cylinders may be reactivated and the engine may resume a non-VDE mode of operation wherein all the cylinders are operated at a lower average cylinder load. In addition, EGR may be stopped (e.g., by closing an EGR valve) due to the engine's reduced EGR tolerance during the reactivation when the cylinders are transitioning to a lower cylinder load. Even though the EGR valve is closed, due to transport delays along the EGR passage, EGR may purge from the air intake system slower than desired, resulting in increased EGR dilution of intake air during the reactivation. Also, during engine operation in the VDE mode, the exhaust catalyst may becomes saturated with oxygen and may need to be regenerated during cylinder reactivation. Therefore, to reduce combustion stability issues arising from the increased EGR dilution of intake air, as well as to expedite catalyst regeneration, during the reactivation, for a number of combustion events since the reactivation, the reactivated cylinders may be operated with fuel delivered as a split fuel injection. For example, fuel may be delivered as at least a first intake stroke injection and a second compression stroke injection. In addition, spark timing may be retarded. A split ratio of fuel delivered in the first intake stroke injection relative to fuel delivered in the second compression stroke injection may be adjusted based on one or more of a duration of the deactivation, a temperature or oxygen loading of an exhaust catalyst coupled downstream of the reactivated cylinders, an amount of spark retard applied, and EGR level at reactivation. By temporarily shifting to a split fuel injection while retarding spark, reactivation of the exhaust catalyst can be expedited, improving exhaust emissions. In addition, combustion stability issues arising from the decrease in individual cylinder load during the transition out of the VDE mode can be better addressed, particularly in the presence of the EGR. The split ratio may also be adjusted based on other engine operating parameters, such as the alcohol content of the injected fuel, to compensate for drivability and engine stumble issues. As such, the use of a split injection and spark retard may be continued for a number of combustion events until the engine speed is at or above a threshold speed where combustion stability is improved (e.g., at or above idling speed) and/or until the EGR is sufficiently bled down.

In this way, by operating reactivated cylinders with split fuel injection for a number of combustion events during a reactivation from VDE mode of engine operation, restart combustion stability of the cylinders is improved. By injecting at least a portion of the fuel during an intake stroke and a remaining portion in a compression stroke, exhaust catalyst regeneration following the VDE mode of operation can be expedited, providing emissions benefits. By further adjusting the split ratio based on an alcohol content of the injected fuel, poor combustion events that may result in a stumble may be reduced. As such, this reduces drivability deterioration from mixed fuel usage. In addition, the use of a split injection during reactivation improves the EGR usage in the active cylinders during the preceding deactivation. Overall, engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
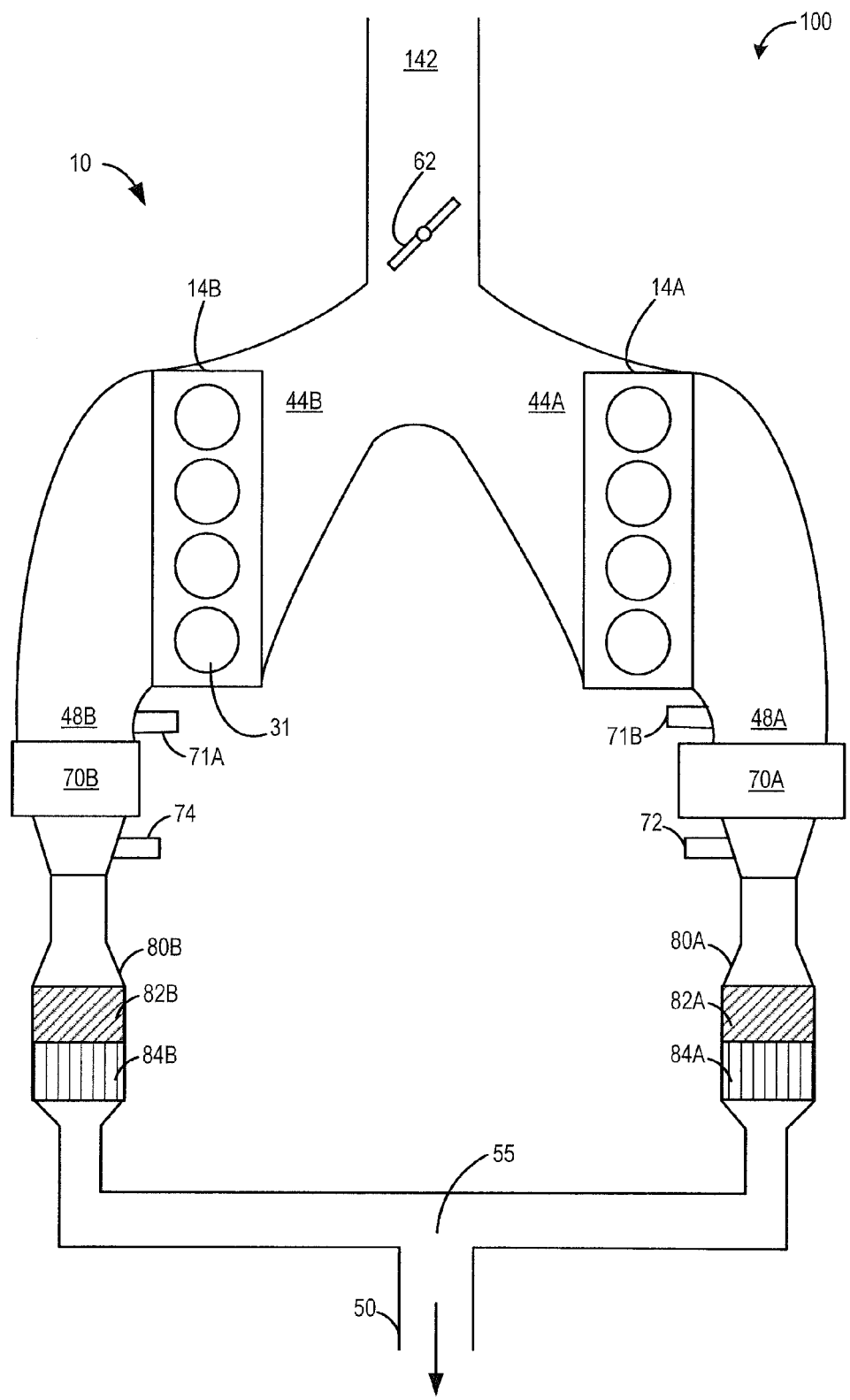
FIGS. 1-2 show example embodiments of an engine and exhaust system layout.
Figure 2:
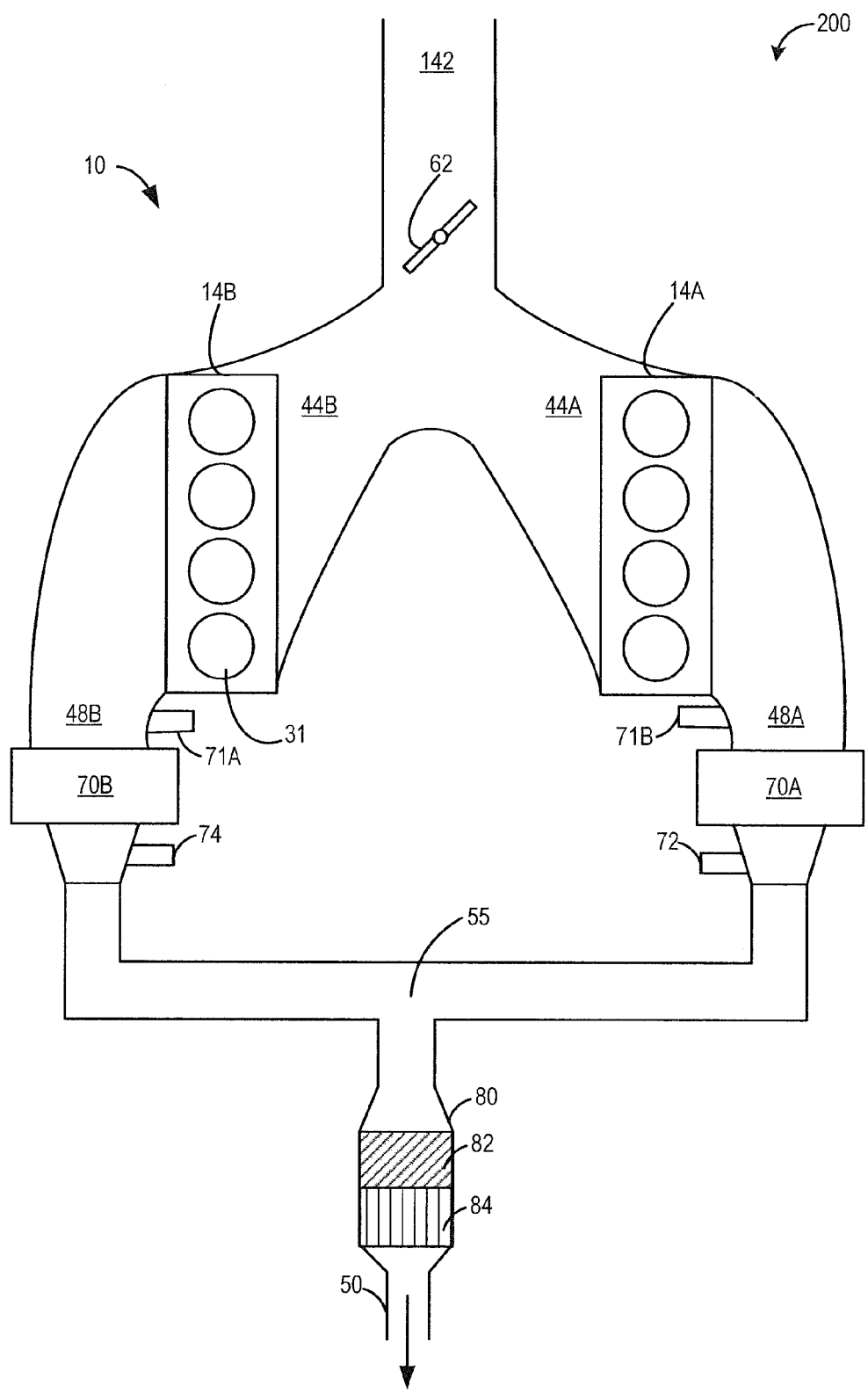
Figure 3:
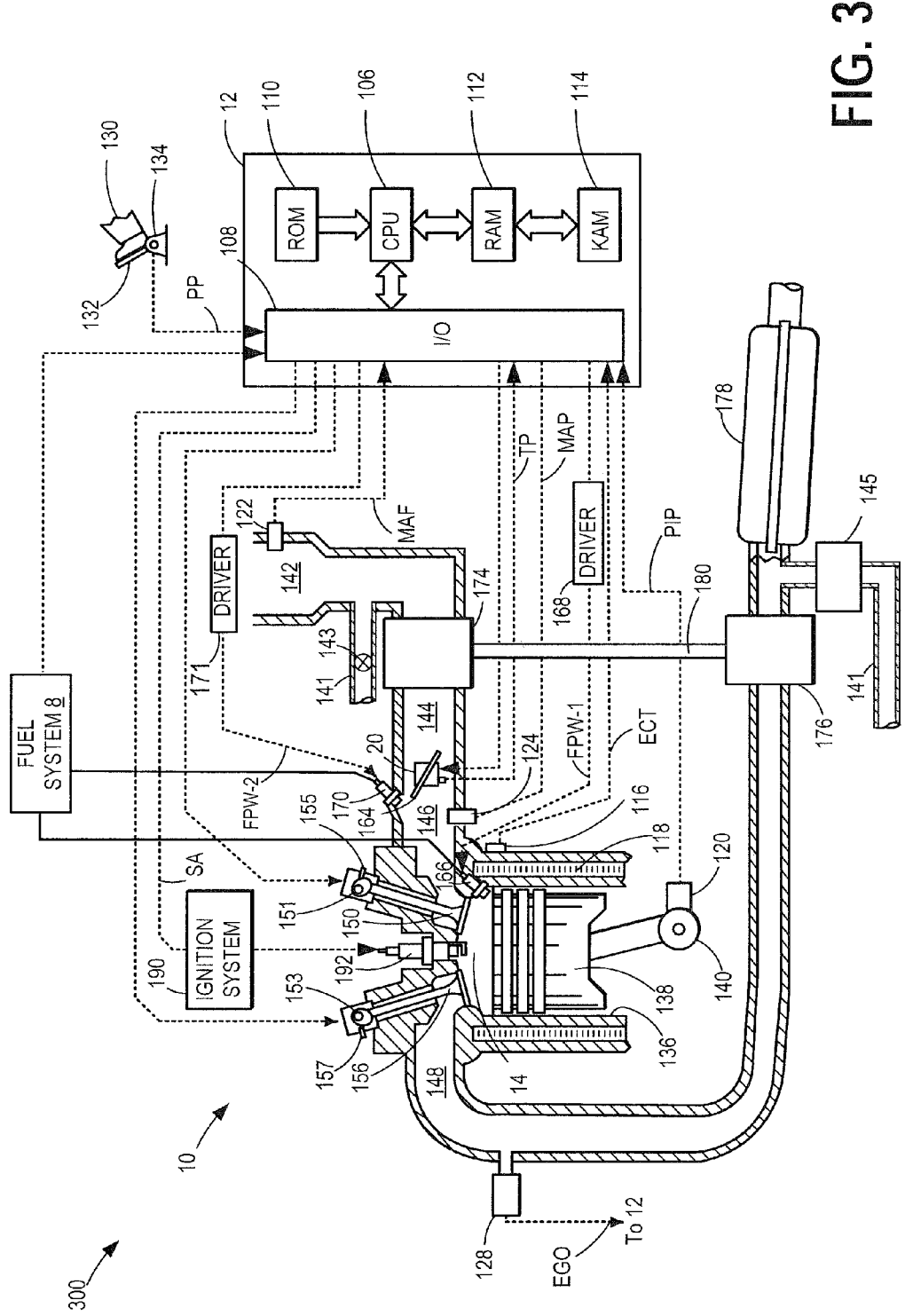
FIG. 3 shows a partial engine view.
Figure 5:
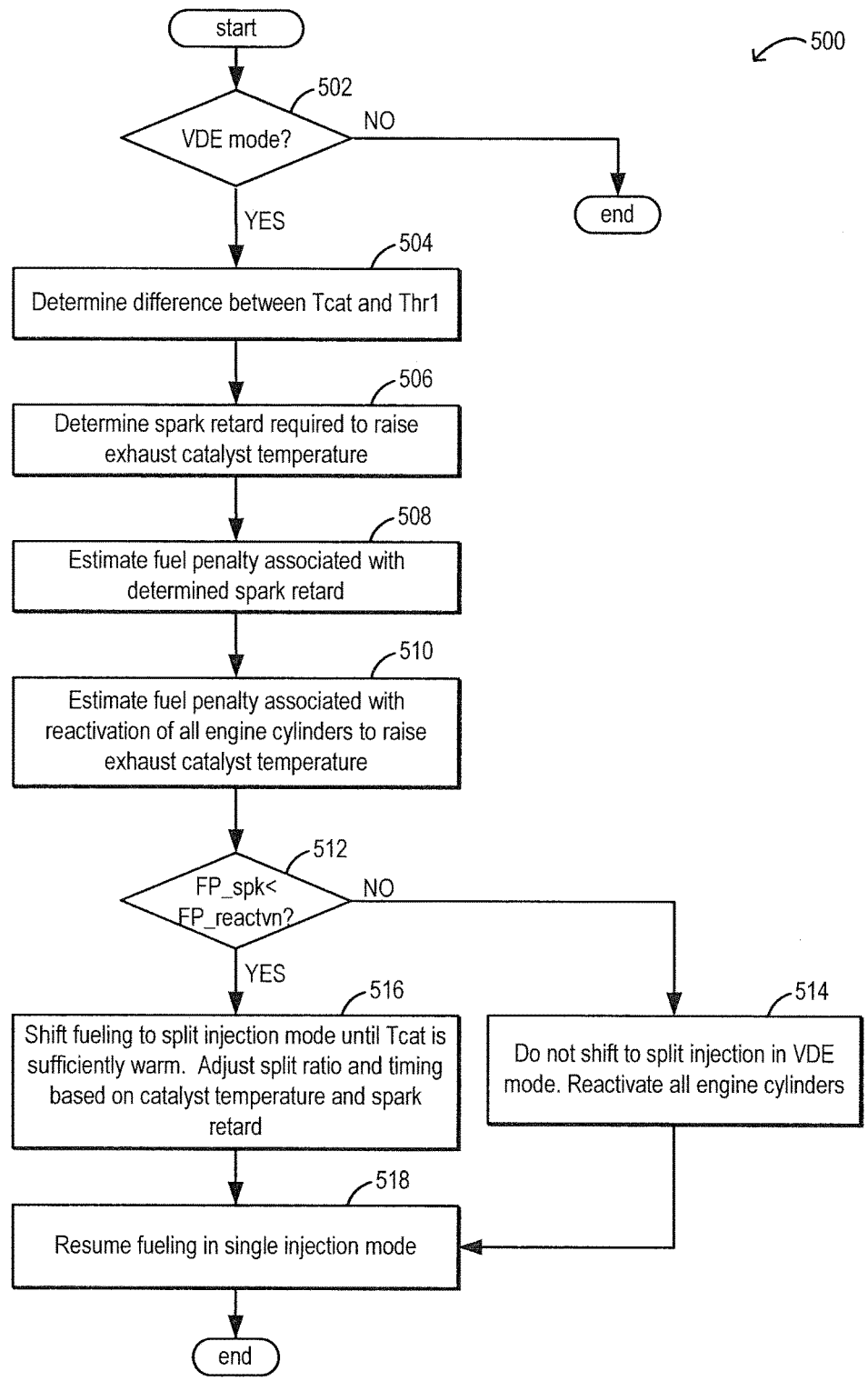
FIG. 5 shows a high level flow chart for adjusting fuel injection during a VDE mode of engine operation responsive to a drop in exhaust catalyst temperature.
Figure 6:
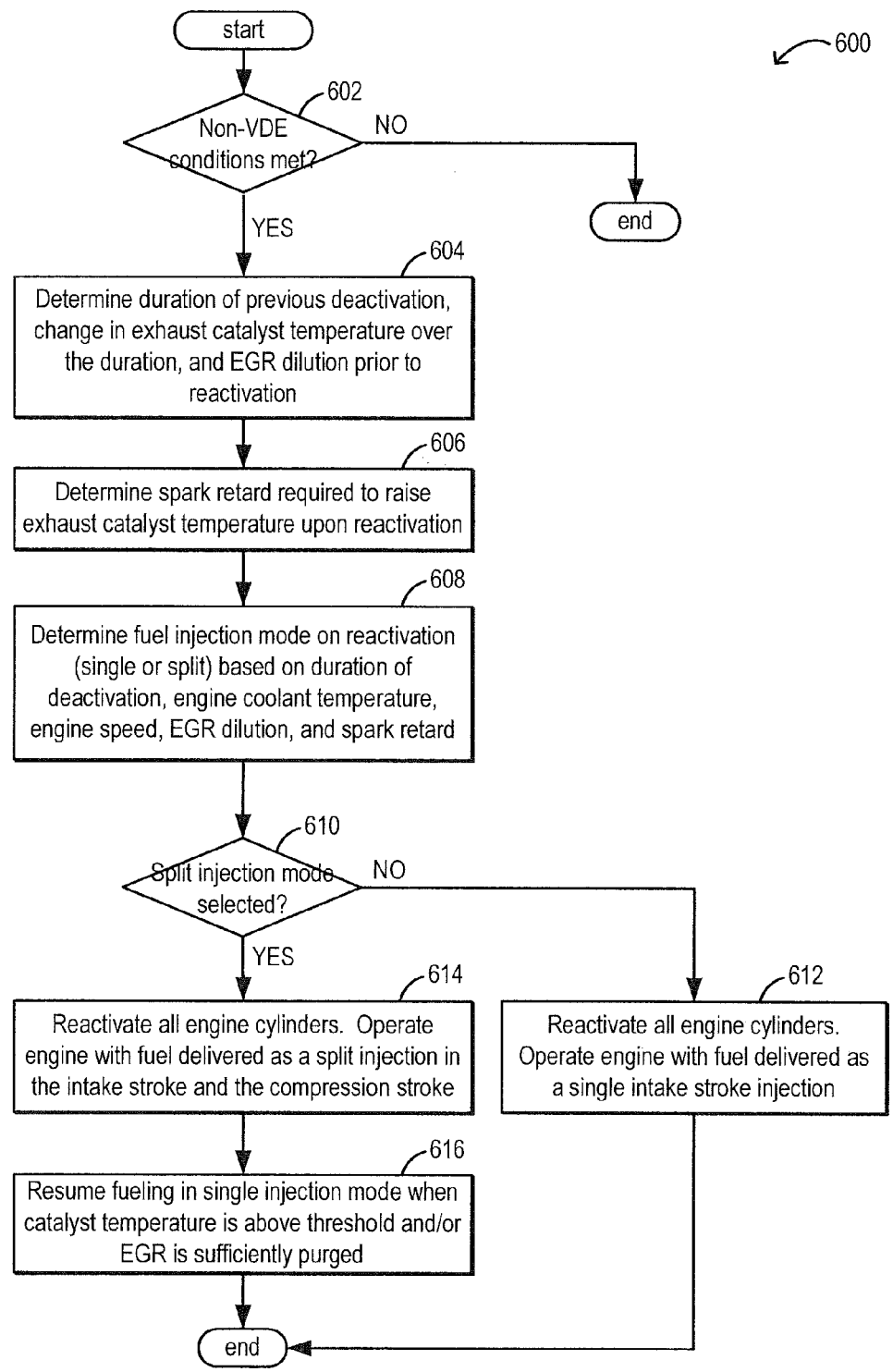
FIG. 6 shows an example fuel injection adjustment during a transition from VDE to non-VDE mode of operation.
Figure 7:
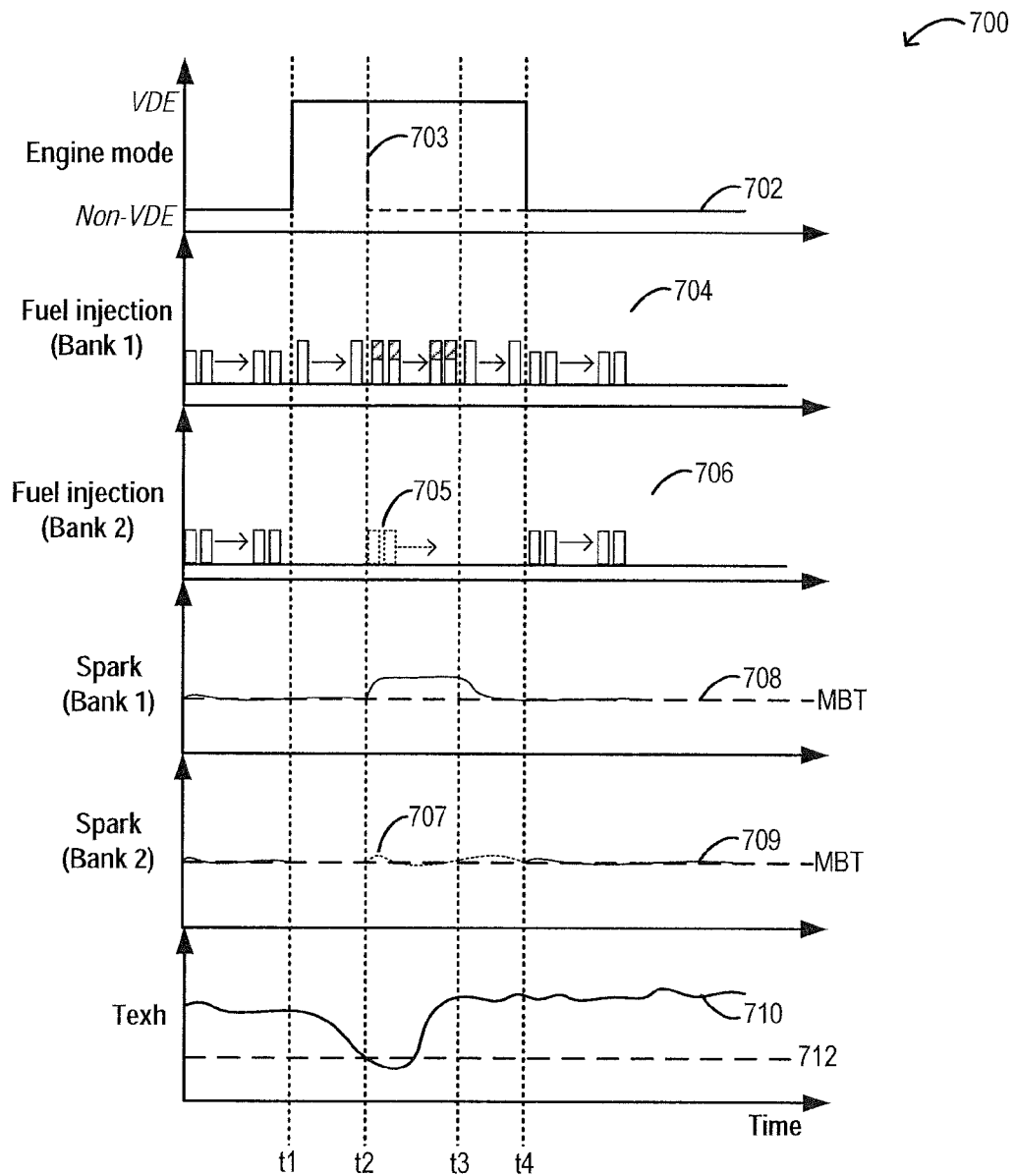
FIGS. 7-9 show example fuel injection adjustments during a VDE mode of operation or during a transition from VDE to non-VDE mode of operation that may be used to manage an exhaust catalyst temperature and combustion stability.
Figure 8:
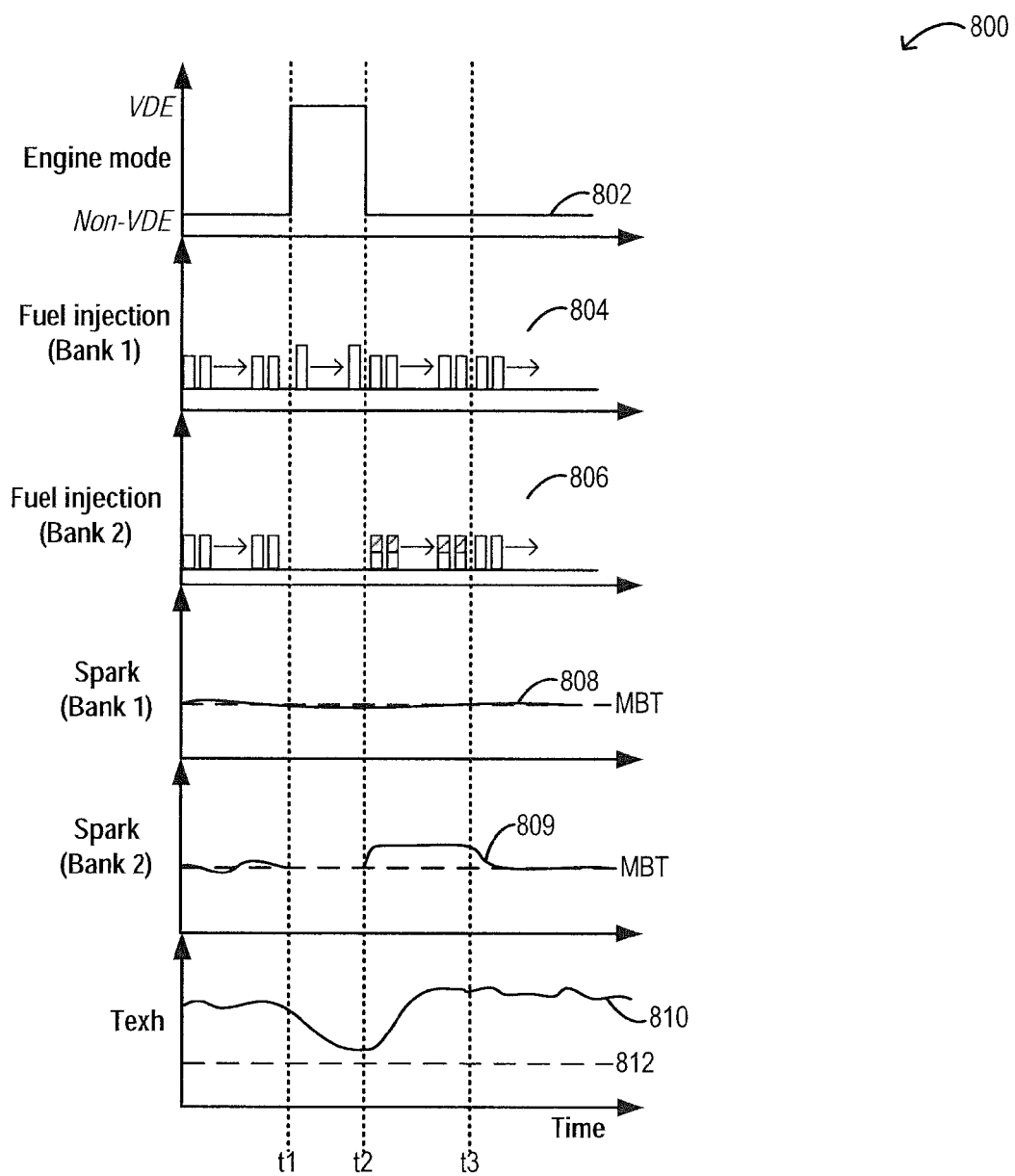
Figure 9:
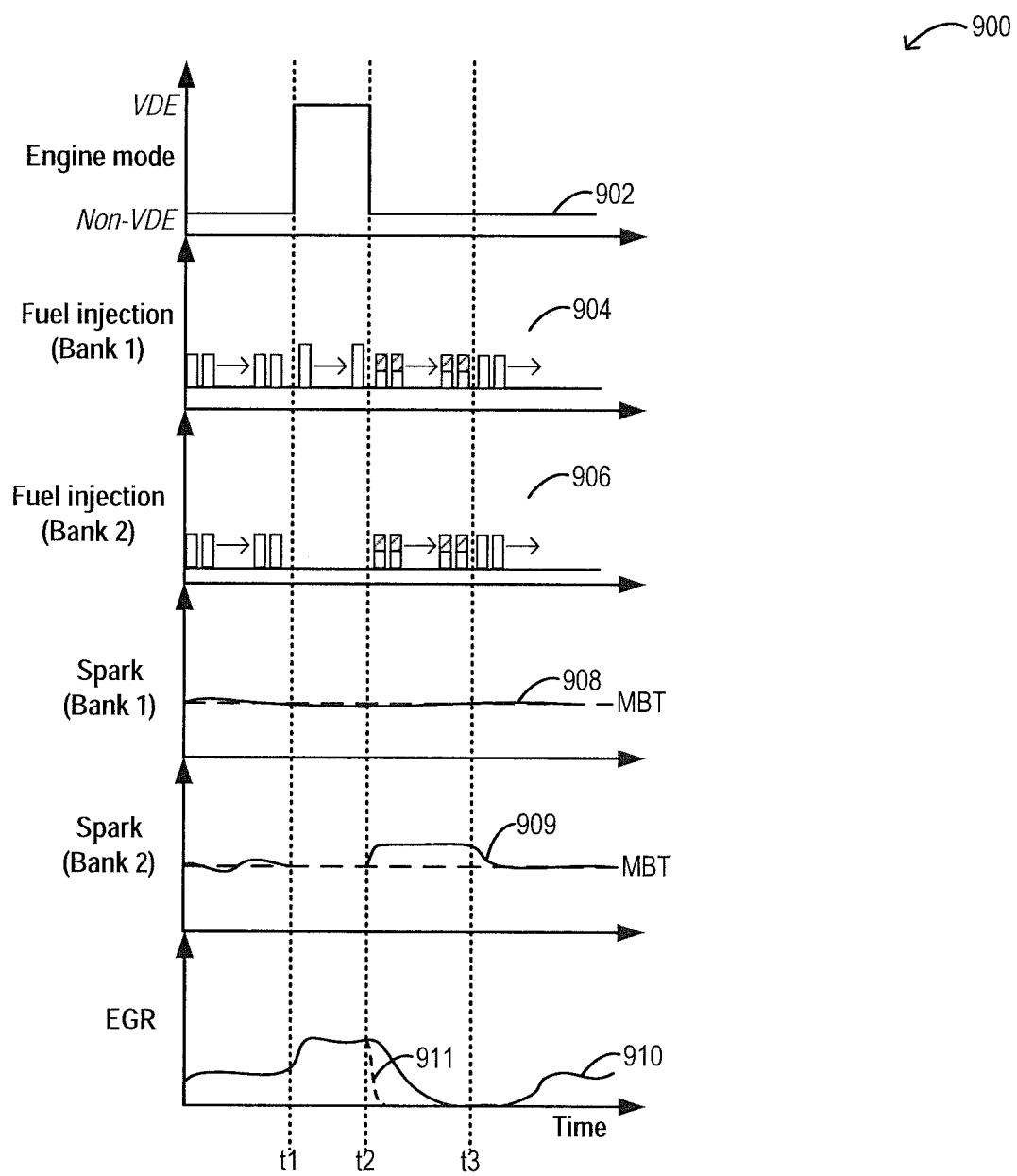

Methods and systems are provided for adjusting a fuel injection profile when operating a variable displacement engine, such as the engine of FIGS. 1-3. The fuel injection profile may be adjusted for active cylinders during a VDE mode of operation to expedite exhaust catalyst heating and thereby prolong operation in the VDE mode. Alternatively, the fuel injection profile may be adjusted for reactivated cylinders during a transition from VDE mode to non-VDE mode of operation to reduce torque disturbances and combustion stability issues while improving exhaust emissions. A controller may be configured to perform a routine, such as the routine of FIG. 4, to shift a fuel injection profile for selected cylinder from a single intake stroke injection to at least a first intake stroke injection and a second compression stroke injection. For example, as shown at FIG. 5 and FIG. 7, the controller may shift the active cylinders during a VDE mode to split fuel injection. As another example, as shown at FIG. 6 and FIGS. 8-9, the controller may shift cylinders being reactivated during a transition out of VDE mode to split fuel injection. In this way, combustion stability issues can be improved when transitioning out of a VDE mode of operation, and cylinder reactivation can be expedited.

FIGS. 1-2 show example embodiments 100 and 200 of engine 10 wherein the engine is configured as a variable displacement engine (VDE). Variable displacement engine 10 includes a plurality of combustion chambers or cylinders 31. The plurality of cylinders 31 of engine 10 are arranged as groups of cylinders on distinct engine banks. In the depicted example, engine 10 includes two engine banks 14A, 14B. Thus, the cylinders are arranged as a first group of cylinders (four cylinders in the depicted example) arranged on first engine bank 14A and a second group of cylinders (four cylinders in the depicted example) arranged on second engine bank 14B. It will be appreciated that while the embodiments depicted in FIGS. 1-2 show a V-engine with cylinders arranged on different banks, this is not meant to be limiting, and in alternate embodiments, the engine may be an in-line engine with all engine cylinders on a common engine bank.

Variable displacement engine 10 can receive intake air via an intake passage 142 communicating with branched intake manifold 44A, 44B. Specifically, first engine bank 14A receives intake air from intake passage 142 via first intake manifold 44A while second engine bank 14B receives intake air from intake passage 142 via second intake manifold 44B. While engine banks 14A, 14B are shown with distinct intake manifolds, it will be appreciated that in alternate embodiments, they may share a common intake manifold or a portion of a common intake manifold. The amount of air supplied to the cylinders of the engine can be controlled by adjusting a position of throttle 62. Additionally, an amount of air supplied to each group of cylinders on the specific banks can be adjusted by varying an intake valve timing of one or more intake valves coupled to the cylinders.

With reference to FIG. 1, combustion products generated at the cylinders of first engine bank 14A are directed to one or more exhaust catalysts in first exhaust manifold 48A where the combustion products are treated before being vented to the atmosphere. A first emission control device 70A is coupled to first exhaust manifold 48A. First emission control device 70A may include one or more exhaust catalysts, such as a close-coupled catalyst. In one example, the close-coupled catalyst at emission control device 70A may be a three-way catalyst. Exhaust gas generated at first engine bank 14A is treated at emission control device 70A before being directed to first underbody emission control device 80A. First underbody emission control device 80A may include a first underbody exhaust catalyst 82A and a second underbody exhaust catalyst 84A. In particular, the first underbody 82A and the second underbody catalyst 84A may be integrated in the underbody emission control device 80A in face-sharing contact with each other. In one example, first underbody exhaust catalyst 82A includes an SCR catalyst configured for selective catalytic reduction wherein NOx species are reduced to nitrogen using ammonia. As another example, second underbody exhaust catalyst 84A includes a three-way catalyst. First underbody exhaust catalyst 82A is positioned upstream of the second underbody exhaust catalyst 84A (in a direction of exhaust flow) in the underbody emission control device 80A but downstream of a third close-coupled exhaust catalyst (included in emission control device 70A).

Exhaust that is treated upon passage through first emission control device 70A and first underbody emission control device 80A is then directed towards exhaust junction 55 along first exhaust manifold 48A. From there, the exhaust can be directed to the atmosphere via common exhaust passage 50.

Combustion products generated at the cylinders of second engine bank 14B are exhausted to the atmosphere via second exhaust manifold 48B. A second emission control device 70B is coupled to second exhaust manifold 48B. Second emission control device 70B may include one or more exhaust catalysts, such as a close-coupled catalyst. In one example, the close-coupled catalyst at emission control device 70A may be a three-way catalyst. Exhaust gas generated at second engine bank 14B is treated at emission control device 70B before being directed to second underbody emission control device 80B. Second underbody emission control device 80B may also include a first underbody exhaust catalyst 82B and a second underbody exhaust catalyst 84B. In particular, the first underbody catalyst 82B and the second underbody catalyst 84B may be integrated in the underbody emission control device 80B in face-sharing contact with each other. In one example, first underbody exhaust catalyst 82B includes an SCR catalyst while second underbody exhaust catalyst 84B includes a three-way catalyst. Second underbody exhaust catalyst 82B is positioned upstream of the second underbody exhaust catalyst 84B (in a direction of exhaust flow) in the underbody emission control device 80B but downstream of a third close-coupled exhaust catalyst (included in emission control device 70B).

While the embodiment of FIG. 1 shows each engine bank coupled to respective underbody emission control devices, in alternate embodiments, such as shown at FIG. 2, each engine bank is coupled to respective emission control devices 70A, 70B but to a common underbody emission control device 80. In embodiment 200 depicted at FIG. 2, the common underbody emission control device 80 is positioned downstream of exhaust junction 55 and common exhaust passage 50. Common underbody emission control device 80 is shown with first underbody exhaust catalyst 82 positioned upstream of and integratably coupled to second underbody exhaust catalyst 84 (in a direction of exhaust flow) in the underbody emission control device 80.

Various air-to-fuel ratio sensors may be coupled to engine 10. For example, a first air-to-fuel ratio sensor 72 may be coupled to the first exhaust manifold 48A of first engine bank 14A, downstream of first emission control device 70A while a second air-to-fuel ratio sensor 74 is coupled to the second exhaust manifold 48B of second engine bank 14B, downstream of second emission control device 70B. In further embodiments, additional air-to-fuel ratio sensors may be coupled upstream of the emission control devices. Still other air-to-fuel ratio sensors may be included, for example, coupled to the underbody emission control device (s). As elaborated at FIG. 3, the air-to-fuel ratio sensors may include oxygen sensors, such as EGO, HEGO, or UEGO sensors. In one example, the downstream air-to-fuel ratio sensors 72, 74 coupled downstream of emission control devices 70A, 70B may be HEGO sensors used for catalyst monitoring while the upstream air-to-fuel ratio sensors coupled upstream of emission control devices 70A, 70B (when included) are UEGO sensors used for engine control.

Further still, one or more temperature sensors may be coupled to the emission control device for estimating a temperature of exhaust entering the device and for estimating a temperature of the emission control device. As elaborated herein, a controller may adjust fuel injection to one or more engine cylinders based on the estimated temperature. For example, as elaborated at FIGS. 4-6, the controller may adjust fuel injection of engine cylinders on a deactivated during reactivation based on the estimated temperature. Alternatively, the controller may adjust fuel injection of active engine cylinders during engine operation in a VDE mode based on the estimated temperature.

One or more engine cylinders may be selectively deactivated during selected engine operating conditions. For example, during low engine loads, one or more cylinders of a selected engine bank may be selectively deactivated. Even though the engine load is lower, by deactivating selected cylinders, the average cylinder load of the remaining active cylinders is increased, improving pumping efficiency. In addition, higher EGR usage may be possible in the active cylinders, even though the engine load is lower. Specifically, EGR may be used when engine loads are higher than a threshold to provide fuel economy and emissions benefits. However, at lower engine loads, EGR usage may not be preferred due to combustion stability issues. By operating the active cylinders at a higher average load, their EGR tolerance is improved and a higher EGR rate can be used during a VDE mode of operation even at overall lower engine loads. The synergistic use of EGR and VDE further improves engine fuel economy.

The selective cylinder deactivation may include deactivating fuel and spark on the selected engine cylinders (or a selected engine bank if an entire bank is deactivated, such as in flat crankshaft arrangements). In addition, an intake and/or exhaust valve timing may be adjusted so that substantially no air is pumped through the inactive engine bank while air continues to flow through the active engine bank. In some embodiments, the deactivated cylinders may have cylinder valves held closed during one or more engine cycles, wherein the cylinder valves are deactivated via hydraulically actuated lifters, or via a cam profile switching (CPS) mechanism in which a cam lobe with no lift is used for deactivated valves. In one example, an engine controller may selectively deactivate all the cylinders of a given engine bank (either 14A or 14B) during shift to a VDE mode and then reactivate the cylinders during a shift back to a non-VDE mode.

By selectively deactivating engine cylinders during low engine load conditions, engine pumping losses and friction losses are reduced, and fuel economy is improved. However, the continued air flow through the inactive bank can lead to a drop in temperature at emission control devices positioned downstream of the inactive bank. In particular, in flat engine crankshaft arrangements having even firing, such as a V6 or a V10 engine, where an entire bank of cylinders is deactivated during the VDE mode, or engine with NVH treatments that allow deactivation of an entire bank, an exhaust catalyst coupled downstream of the inactive bank may need to be reactivated due to catalyst cooling when the bank of cylinders is not operated (and oxygen saturation if the valves continue to pump air through the inactive cylinders).

It will be appreciated that in other engine crankshaft arrangements, such as a V8 engine, during a VDE mode, each bank may have a set of cylinders deactivated. For example, the outer cylinders and inner of each bank may be alternately deactivated. In these arrangements where an entire bank of cylinders is not deactivated during the VDE mode, the exhaust catalyst coupled downstream of the emission control device may not incur a temperature drop.

If the duration of VDE operation is short, significant enrichment and or spark retard may be required after exiting the VDE mode to quickly reactivate the exhaust catalyst. This enrichment adds a fuel penalty. In some cases, the fuel penalty associated with the reactivation can nullify or even exceed the fuel economy benefit of the VDE mode of engine operation.

As elaborated herein with reference to FIGS. 3-6, a controller may operate the active cylinders with a split fuel injection for a duration to maintain exhaust catalyst temperatures above a threshold, thereby delaying the need for significant enrichment during the reactivation. In addition, the use of a split fuel injection may also allow operation in the VDE mode to be prolonged, increasing the fuel economy benefits of the VDE mode of operation. The controller may also transition fuel injection of one or more reactivated engine cylinders during reactivation to a split fuel injection to improve restart combustion stability and reduce torque disturbances and combustion instability during the reactivation.

In embodiments where the engine was operating with EGR during the VDE mode of operation, the use of split injection during the reactivation may be adjusted based on the EGR and maintained while the EGR is bled down. By using a split injection at the time of reactivation, a higher EGR rate can be used in VDE mode because the EGR can be bled down from this higher rate and the transition to the lower cylinder load can be advanced without degrading combustion. Alternatively, the transition to cylinder reactivation can be performed at a higher EGR level during the EGR bleed down period than would have been possible without the use of a split injection, reducing the delay time before transition to cylinder reactivation.

Specifically, when the cylinders are reactivated, EGR may be terminated, and the cylinders may resume operation with a higher average cylinder load (even though the engine load is higher). Since EGR purges out of the intake system slower than required, due to the long transport delay incurred in the EGR passage, the high dilution of air with EGR at the low cylinder load can increase combustion instability and a propensity for misfires. By using split fuel injection during the reactivation while EGR is purged from the intake system, combustion stability issues at low cylinders loads, in particular those due to elevated dilution, can be better addressed. Example fuel injection adjustments are depicted at FIGS. 7-8.

It will be appreciated that in some embodiments, the engine configuration of FIG. 2 may employ a different catalyst reactivation strategy compared to the strategy used for the engine configuration of FIG. 1. This is because the underbody emission control devices of FIG. 2 may convert the emissions, if either device 70a or 70b is inactive, to combusted gas.

FIG. 3 depicts an example embodiment 300 of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more injectors for delivering fuel to the cylinder. As a non-limiting example, cylinder 14 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 166 and 170, different effects may be achieved.

Fuel may be delivered by both injectors to the cylinder during a single cycle of the cylinder. For example, each injector may deliver a portion of a total fuel injection that is combusted in cylinder 14. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 144 may be varied by controller 12 via EGR valve 143. Further, an EGR sensor 145 may be arranged within the EGR passage and may provide an indication of one or more pressure, temperature, and concentration of the exhaust gas.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed. Example methods are discussed with reference to FIGS. 4-6.

Figure 4:
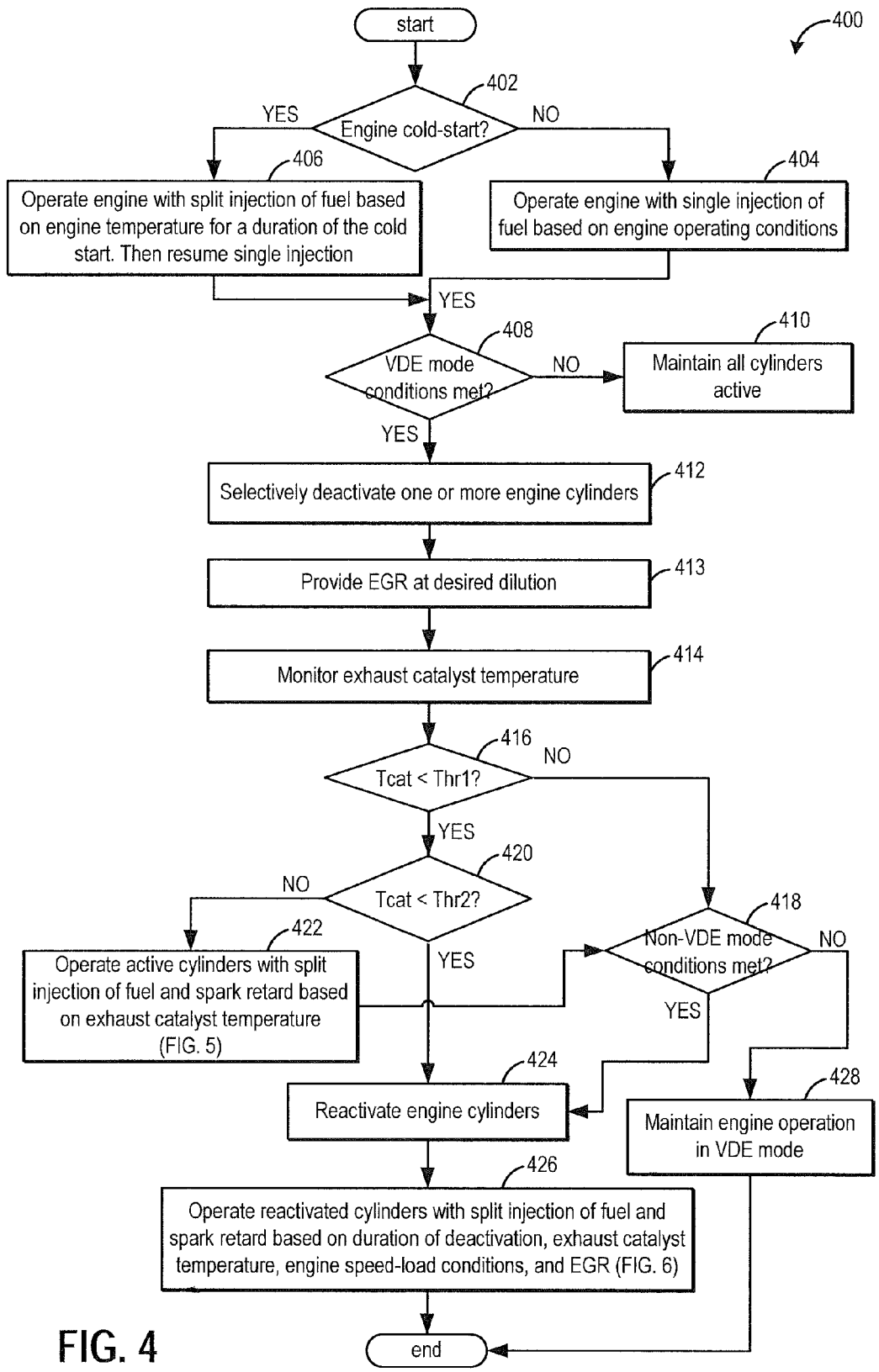
FIG. 4 shows a high level flow chart for adjusting fuel injection during a transition between VDE and non-VDE modes of engine operation.

Now turning to FIG. 4, an example routine 400 is shown for adjusting fuel injection in one or more engine cylinders of a VDE engine. The fuel injection may be adjusted during a transition from VDE to non-VDE mode to reduce torque disturbances during the transition and improve restart combustion stability. The fuel injection may also be adjusted during operation in the VDE mode to rapidly heat an exhaust catalyst and prolong operation in the VDE mode.

At 402, the routine includes confirming an engine cold-start condition. In one example, an engine cold-start may be confirmed if an engine coolant temperature is below a threshold, an exhaust catalyst temperature is below a light-off temperature, an ambient temperature is below a threshold, and/or the engine has been shut down for more than a threshold duration. If an engine cold start is not confirmed (that is an engine hot start is confirmed), then at 404, the routine includes operating the engine with a single fuel injection. The single fuel injection (amount, timing, duration, etc.) may be based on engine operating conditions. For example, fuel may be delivered as a single intake stroke injection. Further, based on the engine operating conditions, the single intake stroke injection may be delivered via direct injection or port injection.

If an engine cold-start is confirmed, then at 406, the routine includes operating the engine with a split fuel injection that is based on engine temperature. Specifically, for a duration of the cold start, a split fuel injection may be performed with at least some fuel delivered as an intake stroke injection and a compression stroke injection. Optionally, at least some fuel may be delivered as an exhaust stroke injection. In one example, the fuel delivered in the exhaust stroke may be provided via port injection while the fuel delivered in the intake and compression strokes may be delivered via direct injection. In addition spark timing may be retarded. By using a split injection during the cold start wherein at least some fuel is direct injected during the compression stroke and the remaining part of the fuel during the intake stroke, a catalyst light-off temperature can be attained without raising exhaust particulate matter (PM) emissions and degrading engine combustion stability. In one example, during an engine cold start, an intake stroke injection may be performed at 240 deg BTDC, a compression stroke injection may be performed at 40 deg BTDC, and a split ratio of 60/40 may be applied. In addition, spark timing may be retarded to 15 deg ATDC.

After a cold start at 406, or a hot start at 404, the routine proceeds to 408 wherein engine operating conditions are estimated and/or measured and it is determined if VDE conditions have been met. The estimated operating conditions may include, for example, engine speed, desired torque (for example, from a pedal-position sensor), manifold pressure (MAP), manifold air flow (MAF), BP, engine temperature, catalyst temperature, intake temperature, spark timing, air temperature, knock limits, etc. In one example, if engine load is below a threshold, VDE conditions may be considered met. If VDE conditions are not met, at 410, all the engine cylinders may be maintained active and the engine may be operated in a non-VDE mode.

If VDE conditions are considered met, then at 412, the routine includes selectively deactivating one or more engine cylinders responsive to the operating conditions. For example, one or more engine cylinders of a first engine bank (or a first group of cylinders) may be deactivated while a second engine bank (or second group of cylinders) remains active. The cylinders may be deactivated via selectively deactivatable fuel injectors. In addition to fuel, spark may also be deactivated from the cylinders. As an example, in flat engine crankshaft arrangements having even firing, such as a V6 or a V10 engine, an entire bank of cylinders may be deactivated during the VDE mode. In alternate other engine crankshaft arrangements, such as a V8 engine, the outermost two cylinders and inner two of each bank may be alternately deactivated.

At 413, based on engine operating conditions and the average cylinder load of the active cylinders, an amount of engine dilution that can be provided may be determined. Based on the dilution requirement, an EGR valve may be adjusted to provide the desired dilution. As such, during the VDE mode of operation, due to the higher average cylinder load, a higher EGR rate can be used (as compared to the same engine load being provided without a VDE mode of operation). This allows EGR benefits to be achieved even during low engine load conditions.

At 414 the routine includes, during the deactivation, monitoring a temperature of an emission control device coupled downstream of the one or more engine cylinders. The monitoring may include, for example, monitoring a temperature of an emission control device coupled downstream of the first (deactivated) engine bank but not the second (active) engine bank. Alternatively, the monitoring may include monitoring a temperature of an emission control device coupled downstream of each of the first and second engine banks. The temperature may be estimated by a temperature sensor or inferred based on operating conditions. In another example, the monitoring may be performed by an exhaust UEGO sensor. It will be appreciated that in engine systems having flat crankshaft arrangements with even firing, such as a V6 or a V10 engine, where an entire bank of cylinders is deactivated during the VDE mode, the temperature drop at the exhaust catalyst coupled to the inactive bank may be more pronounced (e.g., a larger drop in temperature) than in engine systems where an entire bank is not deactivated (such as in a V8 engine wherein either the outer cylinders or inner cylinders of each bank are deactivated).

At 416, it may be determined if the monitored temperature is lower than a first threshold. If the temperature is above the first threshold, sufficient emission control device heating may be inferred and at 418, it may be determined if non-VDE conditions have been met. In one example, non-VDE conditions may be considered met if the engine load or torque demand is higher than a threshold. If non-VDE conditions are not met, then at 428, the engine may continue operation in the VDE mode with some of the cylinders deactivated. If non-VDE conditions are met, then at 424, the routine includes reactivating the previously deactivated engine cylinders. This may include resuming fuel injection and spark in the cylinders. As such, by reactivating the cylinders, an average load of each cylinder is reduced, as compared to the average load of each cylinder during the VDE mode, even though the engine load may be higher.

At 426, during reactivation of the cylinders, the controller may optionally operate the reactivated cylinders with split fuel injection. Additionally, spark timing may be retarded during the reactivation to further expedite heating and reactivation of the exhaust catalyst. As elaborated at FIG. 6, this includes operating the reactivated cylinders with split fuel injection for a number of combustion events following the reactivation and then resuming single fuel injection. The use of a split fuel injection during the reactivation improves the combustion stability of the reactivated cylinders which are now operating at low individual cylinder loads. The split fuel injection may be continued at least until the individual cylinder load increases, such as when the engine speed is at or above a threshold speed (e.g. idling speed). Additionally, if the engine was operating with EGR during the VDE mode, the EGR may be ramped down during the reactivation, and the split fuel injection may be maintained during the reactivation until the EGR has been ramped down to a desired level. The use of a split injection until the EGR has been sufficiently purged improves the cylinders' combustion stability at the low load high dilution conditions.

The split fuel injection may include at least a first intake stroke injection and a second compression stroke injection. In addition to a split fuel injection, the cylinders may be operated with spark retard to maximize exhaust heat generation. The details of the split fuel injection (timing, split ratio, pressure, amount, etc.) may be adjusted based on various parameters including, for example, a duration of the preceding deactivation (that is, duration in VDE mode), exhaust catalyst temperature, engine speed-load conditions at time of reactivation, etc., so as to improve restart combustion stability. In addition, torque disturbances during the transition out of VDE mode and into non-VDE mode can be reduced using the split injection. As such, the split fuel injection used during the reactivation may differ from the split fuel injection used during the engine cold-start. For example, the split ratio used during the reactivation may include relatively less fuel delivered in the compression stroke and relatively more fuel delivered in the intake stroke. In addition, the timing of the compression stroke injection during the reactivation may be closer to intake BDC while the injection during the cold start is closed to compression TDC. In one example, during the transition out of the VDE mode, the split fuel injection in the reactivated cylinders may include an intake stroke injection performed at 240 deg BTDC, a compression stroke injection performed at 40 deg BTDC, and a split ratio of 60/40 (intake:compression) may be applied. In addition, spark timing may be retarded to 15 deg ATDC. In another example, during the transition out of the VDE mode, the split fuel injection in all the reactivated cylinders may include an intake stroke injection performed at 220 deg BTDC, a compression stroke injection performed at 35 deg BTDC, and a split ratio of 70/30 (intake:compression) may be applied. In addition, spark timing may be retarded to 14 deg ATDC.

Returning to 416, if the monitored temperature is below the first threshold (Thr_1), then at 420, it may be determined if the monitored temperature has fallen below a second threshold (Thr_2) lower than the first threshold. The first threshold may be based on, for example, a catalyst light-off temperature. The second threshold may be based on the first threshold and/or the catalyst light-off temperature. In alternate embodiments, a drop rate of the temperature may be determined. In response to the temperature falling below the first threshold, but remaining above the second threshold (or a slower drop in temperature), at 422, the routine includes operating the active cylinders of the engine with split fuel injection. As elaborated with reference to FIG. 5, the operating may be performed for a number of combustion events following the falling of the temperature below the threshold after which cylinder fuel injection based on engine speed-load conditions may be resumed. For example, the active cylinders may resume single fuel injection. The split fuel injection may include at least a first intake stroke injection and a second compression stroke injection. The details of the split fuel injection (timing, split ratio, pressure, amount, etc.) may be adjusted based on the monitored emission control device (or exhaust catalyst) temperature to expedite heating of the catalyst. In doing so, engine operation in the VDE mode may be prolonged. In addition to a split fuel injection, the cylinders may be operated with spark retard to maximize exhaust heat generation. In one example, during the VDE mode, the split fuel injection in the active cylinders may include an intake stroke injection performed at 240 deg BTDC, a compression stroke injection performed at 40 deg BTDC, and a split ratio of 60/40 (intake:compression) may be applied. In addition, spark timing may be retarded to 15 deg ATDC. In another example, during the VDE mode, the split fuel injection in the active cylinders may include an intake stroke injection performed at 230 deg BTDC, a compression stroke injection performed at 35 deg BTDC, and a split ratio of 60/40 (intake:compression) may be applied. In addition, spark timing may be retarded to 12 deg ATDC.

From 422, the routine returns to 418 to determine if non-VDE conditions have been met, and accordingly reactivate the engine cylinders at 424. Optionally, split fuel injection may again be used during the reactivation, but this time in the reactivated cylinders, to improve the transition out of the VDE mode, as discussed above at 426. As such, if non-VDE conditions are not met at 418, the routine includes maintaining VDE mode of engine operation at 428.

Returning to 420, in response to the temperature falling below the first threshold, as well as the second threshold (or a slower drop in temperature), the controller may infer that substantial catalyst cooling has occurred and may reactivate all the engine cylinders at 424. Optionally, split fuel injection may again be used during the reactivation, but this time in the reactivated cylinders, to improve the transition out of the VDE mode, as discussed above at 426. As elaborated at FIG. 5, in response to monitored temperature falling below a light-off threshold, the controller may additionally compare the fuel penalty associated with the split fuel injection and spark retard usage (at 422) with the fuel penalty associated with the reactivation of all the engine cylinders (at 426). The controller may then, based on the comparison, select the strategy that provides most fuel economy (or least fuel penalty).

Now turning to FIG. 5, an example method 500 for temporarily transitioning fuel injection of deactivated engine cylinders to a split fuel injection is shown. The method allows engine operation in the VDE mode to be prolonged. The routine of FIG. 5 may be performed as part of the routine of FIG. 4, specifically at 422.

At 502, the routine includes confirming that the engine is in a VDE mode. Else the routine ends. As such, during the VDE mode, the temperature of an emission control device may be monitored and is expected to fall as the duration of VDE operation increases. Upon confirming VDE mode, at 504, it may be determined by how much the monitored emission control device temperature has fallen below a first threshold. That is, a difference between the estimated temperature (Tcat) and the first threshold (Thr_1) may be determined.

At 506, an amount of spark retard required to raise the monitored temperature above the threshold temperature may be determined. As discussed at FIG. 4, a controller may retard spark timing in the active cylinders in response to the monitored emission control device temperature falling below a (first) threshold. The amount of spark retard applied may be based on a difference between the monitored emission control device temperature and the (first) threshold (e.g., a light-off temperature), an amount of spark retard applied increased as the difference increases.

It will be appreciated that in addition to the use of spark retard, the active engine cylinders may also be operated with exhaust valve timing adjusted so as to maximize exhaust flow through the emission control device. For example, exhaust valve opening may be retarded. In one example, exhaust valve timing adjustments may be performed via corresponding exhaust cam timing adjustments.

At 508, a fuel penalty associated with the calculated amount of spark retard may be determined. At 510, a fuel penalty associated with reactivation of all engine cylinders to raise the exhaust temperature may be determined. At 512, the (first) fuel penalty associated with the use of spark retard (FP_spk) may be compared to the (second) fuel penalty associated with the cylinder reactivation (FP_reactvn).

In alternate embodiments, the routine may include estimating a fuel penalty associated with the retarded spark timing, and determining if the fuel penalty is higher than a threshold penalty, wherein the threshold penalty is based on a fuel penalty associated with cylinder reactivation.

If the fuel penalty associated with the use of spark retard (FP_spk) is less than the fuel penalty associated with the cylinder reactivation (FP_reactvn), then at 516, the routine includes operating the active cylinders with split fuel injection. Herein, the controller may determine that it is more fuel efficient to continue engine operation in the VDE mode but with the active cylinders transiently shifted to use of a split fuel injection and an amount of spark retard (than to transition out of the VDE mode into the non-VDE mode by reactivating the deactivated engine cylinders).

The controller may operate the active cylinders with fuel injected as at least a first intake stroke injection and a second compression stroke injection. As used herein, the first intake stroke injection includes a first injection having one or more of a start time and an end time during an intake stroke, while the second compression stroke injection includes a second injection having one or more of a start time and an end time during a compression stroke. A split ratio of the split fuel injection may be adjusted based on a difference between the monitored temperature and the threshold. Specifically, the adjusted split ratio may include an increase in the first intake stroke injection amount and a corresponding decrease in the compression stroke injection amount as the difference between the monitored temperature and the threshold increases. The split ratio may be further adjusted based on the amount of spark retard applied. For example, as the amount of spark retard used increases, the split ratio may be adjusted to decrease the amount of fuel delivered in the intake stroke. The split ratio may also be adjusted based on an alcohol content of the injected fuel, with the adjusted split ratio including a decrease in the first intake stroke injection amount and a corresponding increase in the compression stroke injection amount as the fuel alcohol content increases.

In one example, during the VDE mode, the split fuel injection in the active cylinders may include an intake stroke injection performed at 240 deg BTDC, a compression stroke injection performed at 40 deg BTDC, and a split ratio of 60/40 (intake:compression) may be applied. In addition, spark timing may be retarded to 15 deg ATSC.

As such, the use of split fuel injection and spark retard in the active cylinders may be continued for a number of combustion events following the drop in emission control device temperature. Then, when the temperature has been returned to or above the first threshold, the split fuel injection and spark retard usage may be discontinued. Thereafter, fuel injection of the active engine cylinders may be adjusted based on engine operating conditions including engine speed and load. As such, this may include resuming fueling in a single injection mode (for example, as a single intake stroke injection) at 518. Alternatively, a split fuel injection may be applied, as required.

If the fuel penalty associated with the use of spark retard (FP_spk) is more than the fuel penalty associated with the cylinder reactivation (FP_reactvn), or if the fuel penalty associated with the use of spark retard is higher than the threshold penalty associated with cylinder reactivation, at 514, the routine includes reactivating the one or more deactivated cylinders responsive to the temperature falling below the threshold, and transitioning out of the VDE mode of engine operation. Herein, VDE of engine operation is discontinued and split injection of the active cylinders is not performed. An example adjustment of active VDE cylinders is shown at FIG. 7.

In this way, a split fuel injection strategy combined with usage of spark retard can be used in active cylinders during selected VDE mode operating conditions to maintain an exhaust catalyst above an activation temperature. In doing so, fuel economy benefits from the continued use of cylinder deactivation can be achieved.

As an example, a method for an engine may comprise selectively deactivating one or more engine cylinders responsive to operating conditions and monitoring a temperature of an exhaust catalyst coupled downstream of the deactivated cylinders. During a first drop in exhaust catalyst temperature, the method includes operating active cylinders with split fuel injection and retarded spark timing while during a second, different drop in exhaust catalyst temperature, the method includes reactivating the one or more deactivated engine cylinders. Herein, the first drop may include a first drop in exhaust catalyst temperature to below a first threshold while the second drop includes a second drop in exhaust catalyst temperature to a second threshold lower than the first threshold. In an alternate example, the first drop may occur at a higher drop rate than the second drop. Further still, the first drop may include a smaller spark retard fuel penalty while the second drop includes a larger spark retard fuel penalty. During the second drop, the controller may operate the engine with exhaust valve opening retarded via adjustments to an exhaust cam timing.

In another example, an engine system comprises an engine with each of a first and second group of cylinders; a fuel injector coupled to each engine cylinder; an emission control device coupled downstream of each of the first and second group of cylinders; and a temperature sensor configured to estimate a temperature of the emission control device. The system may further include a controller including instructions for, selectively deactivating the second group of cylinders while maintaining the first group of cylinders active responsive to operating conditions; and during the deactivation, in response to a drop in temperature of the emission control device, maintaining the second group of cylinders deactivated while shifting fuel injection of the first group of cylinders from single fuel injection to split fuel injection.

Herein, shifting fuel injection from single fuel injection to split fuel injection includes shifting fuel injection from a single intake stroke injection to a first intake stroke injection and a second compression stroke injection, a ratio of the first injection amount to the second injection amount based on the temperature of the emission control device. The controller may include further instructions for, while shifting the fuel injection, operating the first group of cylinders with spark timing retarded, an amount of spark retard applied based on the drop in temperature of the emission control device. The controller may include still further instructions for, while shifting the fuel injection, operating the first group of cylinders with exhaust valve opening retarded, an amount of exhaust valve opening retard applied based on the drop in temperature of the emission control device.

Now turning to FIG. 6, an example method 600 for temporarily transitioning fuel injection of reactivated engine cylinders to a split fuel injection is shown. The method allows restart combustion stability when transitioning out of a VDE mode to be improved. The routine of FIG. 6 may be performed as part of the routine of FIG. 4, specifically at 426.

At 602, the routine includes confirming that the engine is in a VDE mode and that non-VDE conditions have been met. Else the routine ends. Upon confirming that cylinder reactivation conditions have been met, at 604, a duration of the previous deactivation (that is, a duration of operation in the VDE mode) may be determined. In addition, a change in exhaust catalyst temperature over the duration may also be determined. In some embodiments, the controller may also determine an amount of EGR dilution being used in the active cylinders prior to the reactivation.

At 606, an amount of spark retard required to raise the exhaust catalyst temperature upon cylinder reactivation may be determined. That is, an amount of spark retard that has to be applied to the reactivated cylinder upon reentry into non-VDE mode may be determined. In some engine configurations, such as those where an entire bank is deactivated during the VDE mode, a temperature of the exhaust catalyst coupled to the inactive bank may fall over the duration of the cylinder deactivation due to the lack of exhaust heat generated from the deactivated cylinders. As discussed at FIG. 4, a controller may retard spark timing in the reactivated cylinders to raise the exhaust catalyst temperature to or above a light-off temperature to ensure catalytic treatment of exhaust emissions.

At 608, a fuel injection mode to be used on the reactivated cylinders may be determined based at least on the duration of deactivation, the drop in exhaust catalyst temperature, and the EGR dilution applied during the deactivation. Specifically, it may be determined if a single fuel injection or a split fuel injection is required. In one example, if the duration of deactivation is larger and/or a higher drop in exhaust catalyst temperature (of the inactive bank) has occurred over the duration, then use of a split fuel injection with spark retarded by an amount may be used to expedite exhaust catalyst warming. In comparison, if the duration of deactivation is smaller and/or a lower drop in exhaust catalyst temperature has occurred over the duration, then use of a single fuel injection with no spark retard may be sufficient to warm the exhaust catalyst.

The selection may be further based on the determination of combustion stability. For example, if low combustion stability is likely during the reactivation, the split injection may be used. This may be the case when higher EGR dilution was used during the preceding deactivation and lower EGR dilution is required upon reactivation. As previously discussed, the higher cylinder load during the VDE conditions allows for the use of a higher EGR rate. Upon reactivation, the cylinder load may drop, reducing the cylinder's EGR tolerance and therefore requiring EGR rates to be reduced (at least until engine speed has reached a threshold speed after which EGR operation can be resumed). In one example, during the reactivation, no EGR may be desired. Thus, during the reactivation, EGR may be ramped out by closing (or reducing an opening) of the EGR valve. However, due to the long transport delay associated with the EGR circuit, the EGR may ramp down at a slower rate than desired, resulting in cylinders operating at low load and high EGR dilution conditions where they are prone to combustion instability and misfires. During these conditions, the transient shift to a split fuel injection may improve the combustion stability and EGR tolerance of the cylinders. Thus, during conditions where the cylinders were operated with a higher amount of EGR (e.g., higher than a threshold) during the VDE mode, split injection may be selected during the subsequent reactivation or shift to non-VDE mode. In contrast, during conditions where the cylinders were operated with a lower amount of EGR (e.g., lower than a threshold) during the VDE mode, single injection may be selected during the subsequent reactivation or shift to non-VDE mode.

At 610, it may be confirmed that a split injection mode has been selected. If a split injection mode has not been selected, at 612, the routine reactivates all engine cylinders and operates the engine with fuel delivered as a single intake stroke injection. In addition, spark timing may be retarded, as required, to heat the exhaust catalyst of the inactive bank.

Upon confirmation that a split injection mode has been selected, at 614, the routine includes reactivating the previously deactivated engine cylinders and operating the reactivated cylinders with split fuel injection while maintaining single fuel injection in the previously active cylinders. As used herein, operating the reactivated cylinders with split fuel injection includes operating the cylinders with at least a first intake stroke injection and a second compression stroke injection while maintaining a single intake stroke injection of fuel in the cylinders that were active during the preceding VDE mode.

The first intake stroke injection may include a first injection having one or more of a start time and an end time during an intake stroke, while the second compression stroke injection may include a second injection having one or more of a start time and an end time during a compression stroke. A split ratio of the split fuel injection may be based on the estimated duration of the selective deactivation, the split ratio adjusted to decrease an amount of the first intake stroke injection while correspondingly increasing an amount of the second compression stroke injection as the duration of selective deactivation increases. The split ratio may be further adjusted based on the estimated exhaust catalyst temperature, the split ratio adjusted to increase an amount of the first intake stroke injection while correspondingly decreasing an amount of the second compression stroke injection as the catalyst temperature falls below a threshold. The injection timings, split ratio, and spark timing applied to the previously deactivated bank of cylinders allows the catalyst to quickly obtain an efficient operating temperature while still maintaining reasonable combustion stability.

The split ratio of the reactivated cylinders may be further adjusted based on the estimated EGR dilution before the reactivation. In particular, when the EGR dilution is higher, a timing of the fuel injection may be adjusted to provide a larger portion of the fuel during the intake stroke (e.g., as a homogenous lean intake stroke injection) and a smaller portion of the fuel during the compression stroke (e.g., as a rich stratified compression stroke injection). As discussed above, when transitioning from the VDE mode to the non-VDE mode, individual cylinder loads may decrease based on the decrease in aircharge. The lighter cylinder loads generally have less stable combustion and the interaction with the transient fuel compensation, and other cylinder conditions that are different than the operating cylinders due to cooling during deactivation may contribute to less stable combustion during reactivation. The EGR may continue to interfere with the lighter cylinder load until the EGR delivered to the cylinders has been sufficiently bled down to reduce combustion issues. While charge motion control valves (CMCVs) can be used to adjust the in-cylinder motion of the air fuel mixture delivered to the cylinder during the transition (due to the better mixing and more stable combustion), the slower response time of the CMCV (e.g., the CMCV not shutting quickly enough when transitioning to the lower cylinder load), combustion stability can become compromised leading to slow burns or even misfires during the reactivation. Thus, by using a split fuel injection, the combustion stability at low cylinder load can be improved. In one example, the portion of fuel delivered during the compression stroke may correspond to the minimum flow mass of the injector. By adjusting the timing of the compression injection to coincide with spark timing (or performing the compression injection immediately before or after the spark event), a stratified charge combustion can be used to reduce cylinder burn times. In addition, the stratified combustion may enhance oxidation in the catalyst, and further improve the catalyst reheating.

As such, one or more of the split ratio, timing and a pressure of the fuel injection may be further adjusted based on an alcohol content of the injected fuel. For example, the amount of second compression stroke injection may be increased and the amount of the first intake stroke injection may be correspondingly decreased as the alcohol content of the injected fuel increases.

In addition to the split fuel injection, during the reactivation, spark timing may be retarded in the reactivated cylinders to expedite exhaust catalyst heating. Specifically, an amount of spark retard may be adjusted based on the exhaust catalyst temperature (e.g., based on a difference between the exhaust catalyst temperature and a light-off temperature or alternate threshold temperature).

In one example, the split fuel injection in the reactivated cylinders may include an intake stroke injection performed at 240 deg BTDC, a compression stroke injection performed at 40? deg BTDC, and a split ratio of 60/40 (intake: compression) may be applied. In addition, spark timing may be retarded to 15 deg ATDC.

As such, the operating of the reactivated cylinders with split fuel injection may be performed for a number of combustion events since the reactivation. For example, until an engine speed is at or above a threshold speed (e.g., idling speed) and/or until the EGR rate is below a threshold (e.g., EGR fully purged). Then, at 616, fueling in the single injection mode may be resumed. For example, after the number of combustion events has elapsed, the controller may operate the reactivated cylinders with fuel injected as a single fuel injection in the intake stroke.

The number of combustion events may be based on an engine load during the cylinder reactivation, the number of combustion events increased until the engine load reaches steady-state conditions. The number of combustion events may be further based on a duration of selective deactivation, an exhaust catalyst temperature, and an EGR level during the reactivation, the number of combustion events increased as the duration increases, the exhaust catalyst temperature decreases and the EGR level increases.

It will be appreciated that during the reactivation, while the reactivated cylinders are operated with split fuel injection, the already active cylinders may be operated with fuel injection adjusted based on engine speed-load conditions. For example, the active cylinders may be operated with single fuel injection for the number of combustion events, the single fuel injection including fuel injected as a single intake stroke injection.

In this way, by operating reactivated cylinders with split fuel injection for a number of combustion events during a reactivation from VDE mode of engine operation, restart combustion stability of the cylinders is improved.

As an example, a method for an engine comprises, selectively deactivating one or more engine cylinders in response to operating conditions; and during reactivation, operating reactivated cylinders with fuel injected as each of an intake stroke injection and a compression stroke injection for a number of combustion events since the reactivation. A ratio of fuel injected in the intake stroke injection relative to the compression stroke injection may be based on a temperature of an exhaust catalyst, an amount of fuel injected in the intake stroke increased as the temperature of the exhaust catalyst falls below a threshold. Herein, selectively deactivating one or more engine cylinders includes deactivating one or more engine cylinders of a first engine bank, the engine including a second bank, and wherein the ratio of fuel injected is based on a temperature of an exhaust catalyst coupled to the first bank and not the second bank. The split ratio of fuel injected may be further based on an alcohol content of the injected fuel, an amount of fuel injected in the intake stroke injection decreased and an amount of fuel injected in the compression stroke injection correspondingly increased as the alcohol content of the injected fuel increases.

In another example, a method for an engine comprises selectively deactivating one or more engine cylinders. Then, during a first reactivation, the method includes operating the reactivated cylinders with fuel injected as a single injection. In comparison, during a second reactivation, the routine includes operating the reactivated cylinders with fuel injected as a split injection with fuel injected as each of an intake stroke injection and a compression stroke injection. Herein the second reactivation occurs after a longer duration of deactivation while the first reactivation occurs after a shorter duration of deactivation. The method further includes, during the first reactivation, maintaining spark timing of the reactivated cylinders, and during the second reactivation, retarding spark timing of the reactivated cylinders.

Now turning to FIG. 7, map 700 depicts an example fuel injection adjustment for active engine cylinders. The adjustment is performed responsive to a drop in exhaust catalyst temperature to allow cylinder deactivation to be prolonged. Map 700 depicts an engine mode of operation (VDE or non-VDE) at plot 702, fuel injection profile of a first engine bank at plot 704, fuel injection profile of a second engine bank at plot 706, spark timing of the first engine bank at plot 708, spark timing of the second engine bank at plot 709, and an exhaust catalyst temperature of an catalyst coupled to the second bank (the bank that is inactivated during the VDE mode) at plot 710.

Prior to t1, the engine may be operating in a non-VDE mode (plot 702) with all cylinders on each bank firing. During the non-VDE mode of operation, cylinders in both the first and second engine bank may be receiving fuel (plots 704-706) as a single intake stroke injection (depicted by single solid bar). At t1, in response to a change in operating conditions (e.g., a drop in engine load or torque demand), the engine may shift to a VDE mode of operation. Specifically, all cylinders on the second engine bank may be selectively deactivated by shutting of fuel and spark (plot 709) while all cylinders on the first engine bank remain active (plot 704 and 708). As such, due to the cylinder deactivation, the cylinder load of the active cylinders on the first engine bank may increase. As shown, the active cylinders on the first engine bank may continue single intake stroke injection (with a larger amount of total fuel injected corresponding to the higher cylinder load).

Between t1 and t2, as engine operation with cylinder deactivation continues, there may be a drop in temperature at the exhaust catalyst temperature coupled downstream of the inactive bank such that at t2, the exhaust catalyst is at or below a threshold temperature 712. For the deactivated bank, with deactivated valves, there will be no airflow through the bank, but the catalyst will cool since no combusted air and fuel mixture is heating the catalyst. As such, this drop in exhaust catalyst temperature may not only lead to a preponing of cylinder reactivation, but also lead to a fuel penalty during the cylinder reactivation because of the extra heat that needs to be generated to heat the catalyst. Thus, to reduce the fuel penalty and allow the engine to remain in the VDE more for a longer time, at t2, while maintaining the second bank deactivated, fuel injection of the active cylinders on the first bank may be shifted to a split fuel injection (plot 704). Specifically, the total amount of fuel may be delivered as a first intake stroke injection (depicted by solid bar) and a second compression stroke injection (depicted by hatched bar). Split fuel injection timing, ratio, and pressure may be adjusted based at least on a difference between the exhaust catalyst temperature and the threshold. In the depicted example, the split ratio is adjusted to include a higher amount of the first intake stroke injection and a lower amount of the second compression stroke injection. In addition to the split fuel injection, spark timing may be retarded from MBT in the active cylinders (plot 708), the spark retard adjusted to raise the exhaust temperature sufficiently so that the exhaust catalyst can be warmed.

The use of split fuel injection alongside spark retard in the active cylinders is continued for a number of combustion events between t2 and t3 until the catalyst temperature is returned at or above threshold 712. At t3, once the catalyst has been sufficiently warmed, single intake stroke fuel injection in the active cylinders is resumed while spark is returned to MBT. At t4, in response to reactivation conditions being met (e.g., a rise in engine load or torque demand), the deactivated cylinders of the second bank may be reactivated with fuel and spark returned to the cylinders.

As such, if the active cylinders were not shifted transiently to a split fuel injection mode, the second engine bank may have needed to be reactivated much earlier (as shown at dotted line 703), specifically at t2, in response to the drop in exhaust catalyst temperature. Therein, fuel injection (see 705) and spark (see 707) may be returned to the second bank at t2. As such, this may reduce the fuel economy benefits of VDE operation by cutting short the duration of engine operation in VDE mode. Thus, by shifting the active cylinders to a split fuel injection, VDE operation can be prolonged and fuel economy benefits can be extended for a longer duration of engine operation.

While FIG. 7 shows spark timing on the active bank (bank_1) at MBT between t1 and t2, it will be appreciated that in alternate examples, between t1 and t2, spark timing on the active bank may be retarded from MBT due to operating at higher cylinders loads and protection from borderline limits. However, when used, the level of spark retard used during the VDE mode when catalyst heating is not required (as between t1 and t2) would not be as large as the spark retard amount used during catalyst heating (as depicted between t2 and t3).

It will also be appreciated that the engine configuration used in the example of FIG. 7 may correspond to an engine where all engine cylinders of a bank are deactivated, such as in engines with flat crankshaft arrangement and even firing order (e.g., V6 or V10 engines). In alternate engine configurations, such as where the engine has uneven firing order (e.g., a V8 where at a given time, the outer or inner cylinders of a bank are deactivated), the controller may monitor the temperature of an exhaust catalyst coupled to each bank and in response to cooling on any given bank, the active cylinders of that bank may be shifted to a split fuel injection. For example, during a VDE mode, a first group of cylinders of a first bank and a first group of cylinders of a second bank may be deactivated while a second group of cylinders of the first bank and a second group of cylinders of the second bank remain active. In response to a drop in exhaust catalyst temperature at the first bank (but not second bank), during the VDE mode, the second group of cylinders of the first bank may be shifted to a split fuel injection, while the active cylinders of the second bank are maintained operating with single fuel injection. Likewise, in response to a drop in exhaust catalyst temperature at the second bank (but not first bank), during the VDE mode, the second group of cylinders of the second bank may be shifted to a split fuel injection, while the active cylinders of the first bank are maintained operating with single fuel injection. This allows engine operation in the VDE mode to be prolonged.

Now turning to FIG. 8, map 800 depicts an example fuel injection adjustment for reactivated engine cylinders. The adjustment is performed during a transition out of VDE mode to improve restart combustion stability and transient torque disturbances. Map 800 depicts an engine mode of operation (VDE or non-VDE) at plot 802, fuel injection profile of a first engine bank at plot 804, fuel injection profile of a second engine bank at plot 806, spark timing of the first engine bank at plot 808, spark timing of the second engine bank at plot 809, and a temperature of an exhaust catalyst temperature coupled to the inactive bank at plot 810.

Prior to t1, the engine may be operating in a non-VDE mode (plot 802) with all cylinders on each bank firing. During the non-VDE mode of operation, cylinders in both the first and second engine bank may be receiving fuel (plots 804-806) as a single intake stroke injection (depicted by single solid bar). In addition, spark may be at a nominal timing, such as at MBT. At t1, in response to a change in operating conditions (e.g., a drop in engine load or torque demand), the engine may shift to a VDE mode of operation. Specifically, cylinders on the second engine bank may be selectively deactivated by shutting of fuel and spark (plots 806 and 809) while cylinders on the first engine bank remain active (plots 804 and 808). As such, due to the cylinder deactivation, the cylinder load of the active cylinders may increase. As shown, the active cylinders on the first engine bank may continue single intake stroke injection (with a larger amount of total fuel injected corresponding to the higher cylinder load).

Between t1 and t2, as engine operation with cylinder deactivation continues, there is a gradual drop in exhaust catalyst temperature due to the lack of a hot combusted air-fuel mixture flowing over the exhaust catalyst, since the entire bank coupled to the catalyst is inactive. At t2, the exhaust catalyst may be close to threshold temperature 812 and engine reactivation conditions may be met. For example, the engine load and torque demand may increase. When transitioning from the VDE mode to the non-VDE mode, individual cylinder loads may decreases based on the decrease in aircharge. The lighter cylinder loads generally have less stable combustion and the interaction with the transient fuel compensation, and other cylinder conditions that are different than the operating cylinders due to cooling during deactivation may contribute to less stable combustion during reactivation.

To overcome the issues related to the exhaust catalyst activation and also to improve restart combustion stability, at t2, during the reactivation, while maintaining the single injection of the first bank, fuel injection of the reactivated cylinders on the second bank may be shifted to a split fuel injection (plot 806). Specifically, the total amount of fuel may be delivered as a first intake stroke injection (depicted by solid bar) and a second compression stroke injection (depicted by hatched bar). Split fuel injection timing, ratio, and pressure may be adjusted based at least on a difference between the exhaust catalyst temperature and the threshold. In the depicted example, the split ratio is adjusted to include a higher amount of the first intake stroke injection and a lower amount of the second compression stroke injection. In addition to the split fuel injection, spark timing may be retarded from MBT in the reactivated cylinders (plot 809), the spark retard adjusted to raise the exhaust temperature sufficiently so that the exhaust catalyst can be warmed. The spark timing of the first engine bank may be maintained at MBT.

The use of split fuel injection alongside spark retard in the reactivated cylinders is continued for a number of combustion events between t2 and t3 until the catalyst temperature is raised, and the engine speed has increased to a level where combustion stability is not degraded. For example, the split injection may be continued at least until the engine speed is at or above an idle speed. At t3, once the catalyst has been sufficiently warmed, and the engine speed has reached an idle speed, single intake stroke fuel injection in the reactivated cylinders is resumed while spark is returned to MBT.

While FIG. 8 shows spark timing on the active bank (bank_1) at MBT between t1 and t2, it will be appreciated that in alternate examples, between t1 and t2, spark timing on the active bank may be retarded from MBT due to operating at higher cylinders loads and protection from borderline limits. However, when used, the level of spark retard used during the VDE mode when catalyst heating is not required (as between t1 and t2) would not be as large as the spark retard amount used on the reactivated bank (bank_2) during catalyst heating (as depicted between t2 and t3).

It will also be appreciated that the engine configuration used in the example of FIG. 8 may correspond to an engine where all engine cylinders of a bank are deactivated, such as in engines with flat crankshaft arrangement and even firing order (e.g., V6 or V10 engines). In alternate engine configurations, such as where the engine has uneven firing order (e.g., a V8 where at a given time, the outer or inner cylinders of a bank are deactivated), the controller may monitor the temperature of an exhaust catalyst coupled to each bank and in response to cooling on any given bank, the reactivated cylinders of that bank may be shifted to a split fuel injection. For example, during a VDE mode, a first group of cylinders of a first bank and a first group of cylinders of a second bank may be deactivated while a second group of cylinders of the first bank and a second group of cylinders of the second bank remain active. In response to a drop in exhaust catalyst temperature at the first bank (but not second bank), the engine may be shifted to a non-VDE mode and during the reactivation, at least the first group of cylinders of the first bank may be shifted to a split fuel injection, while the cylinders of the second bank are maintained operating with single fuel injection. Optionally, based on the exhaust catalyst temperature drop, during the reactivation, all cylinders of the first bank may be shifted to a split fuel injection. Likewise, in response to a drop in exhaust catalyst temperature at the second bank (but not first bank), the engine may be shifted to a non-VDE mode and during the reactivation, at least the first group of cylinders of the second bank may be shifted to a split fuel injection, while the cylinders of the first bank are maintained operating with single fuel injection. Optionally, based on the exhaust catalyst temperature drop, during the reactivation, all cylinders of the second bank may be shifted to a split fuel injection. This improves cylinder restartability.

Now turning to FIG. 9, map 900 depicts an example fuel injection adjustment for reactivated engine cylinders. The adjustment is performed during a transition out of VDE mode to improve restart combustion stability and transient torque disturbances. Map 900 depicts an engine mode of operation (VDE or non-VDE) at plot 902, fuel injection profile of a first engine bank at plot 904, fuel injection profile of a second engine bank at plot 906, spark timing of the first engine bank at plot 908, spark timing of the second engine bank at plot 909, and an EGR level (of all active cylinders, during VDE or non-VDE mode) at plot 910.

Prior to t1, the engine may be operating in a non-VDE mode (plot 902) with all cylinders on each bank firing due to engine load being higher than a threshold. During the non-VDE mode of operation, cylinders in both the first and second engine bank may be receiving fuel (plots 904-906) as a single intake stroke injection (depicted by single solid bar). In addition, spark (plot 908-909) may be at a nominal timing, such as at MBT. Further, due to the higher engine load conditions, EGR may be provided to the engine cylinders as shown (plot 910, before t1, shows the EGR level in all engine cylinders) by increasing the opening of an EGR valve. In one example, the EGR provided may be low-pressure EGR. Further, the EGR may be provided at a fixed rate (that is, at a fixed percentage relative to airflow). In another example, the LP-EGR may be provided at a variable rate relative to airflow. In still further examples, EGR may be provided as a combination of low-pressure and high-pressure EGR.

At t1, in response to a change in operating conditions (e.g., a drop in engine load or torque demand), the engine may shift to a VDE mode of operation. Specifically, cylinders on the second engine bank may be selectively deactivated by shutting of fuel and spark (plots 906 and 909) while cylinders on the first engine bank remain active (plots 904 and 908). As shown, the active cylinders on the first engine bank may continue single intake stroke injection (with a larger amount of total fuel injected corresponding to the higher cylinder load).

As such, due to the cylinder deactivation, the cylinder load of the active cylinders may increase. This improves their EGR tolerance and allows for a higher level of EGR to be used in the active cylinders during the VDE mode of operation (plot 910, between t1 and t2, shows the EGR level of the active cylinders). By using EGR in addition to VDE, further fuel economy benefits are achieved. Furthermore, EGR benefits can be extended to the low engine load conditions due to the elevated cylinder load during the VDE mode of operation.

At t2, in response to a change in operating conditions (e.g., an increase in engine load or torque demand), the engine may shift back to a non-VDE mode of operation. Specifically, cylinders on the second engine bank may be selectively reactivated by returning fuel and spark. Due to the cylinder reactivation, the cylinder load of the active cylinders may decrease. The lighter cylinder loads generally have less stable combustion and the interaction with the transient fuel compensation, and other cylinder conditions during deactivation may contribute to less stable combustion during reactivation. In addition, the lower cylinder load reduces their EGR tolerance. Thus, at t2, an EGR valve may be closed and EGR may be ramped out during the reactivation. However, due to long transport delays along the EGR passage, the actual EGR ramp out rate (plot 910) may be slower than the desired ramp-out rate (dashed segment 911). In particular, the EGR may continue to interfere with the lighter cylinder load until the EGR delivered to the cylinders has been sufficiently bled down to reduce combustion issues. While charge motion control valves (CMCVs) can be used to adjust the in-cylinder motion of the air fuel mixture delivered to the cylinder during the transition (due to the better mixing and more stable combustion), due to the slower response time of the CMCV (e.g., the CMCV not shutting quickly enough when transitioning to the lower cylinder load), combustion stability can become compromised leading to slow burns or even misfires during the reactivation.

To overcome these issues and improve restart combustion stability, at t2, during the reactivation, fuel injection of all the cylinders, including the reactivated cylinders on the second bank as well as the active cylinders of the first bank, may be shifted to a split fuel injection (plot 906). Specifically, the total amount of fuel may be delivered as a first intake stroke injection (depicted by solid bar) and a second compression stroke injection (depicted by hatched bar). Split fuel injection timing, ratio, and pressure may be adjusted based at least on the EGR dilution present in the engine system prior to the reactivation (that is, during the immediately preceding deactivation). In the depicted example, the split ratio is adjusted to include a higher amount of the first intake stroke injection and a lower amount of the second compression stroke injection. In addition to the split fuel injection, spark timing may be retarded from MBT in the reactivated cylinders (plot 909), the spark retard adjusted to raise the exhaust temperature sufficiently so that the exhaust catalyst on the previously inactive bank be warmed. At the same time, the spark timing of the first engine bank may be maintained at MBT.

It will be appreciated that in example of FIG. 9, split injection is used in all engine cylinders during reactivation until the EGR in the intake system has bled down because EGR is delivered to all the engine cylinders via a common EGR passage. However, there may be alternate engine configurations wherein the EGR system is configured to deliver EGR to distinct sets of cylinders via distinct passages. In those engine configurations, it may be possible to deliver EGR to only the active cylinders during the VDE mode of operation, in which case during the subsequent cylinder reactivation, split fuel injection may be used in only the previously active cylinders until the EGR has sufficiently purged, while the reactivated cylinders are maintained in single fuel injection.

The use of split fuel injection is continued on both engine banks (in the depicted example) for a number of combustion events between t2 and t3 until the EGR is sufficiently purged. At t3, once the EGR has dropped to a sufficiently low level, single intake stroke fuel injection in the reactivated cylinders is resumed. Also, spark timing in the reactivated engine bank may be returned to MBT.

It will be appreciated that while the example of FIG. 9 shows spark timing retarded between t2 and t3, in alternate examples, spark retard on the reactivated cylinders may be adjusted based on the exhaust catalyst temperature. Also, while FIG. 9 shows spark timing on the active bank (bank_1) at MBT between t1 and t2, it will be appreciated that in alternate examples, between t1 and t2, spark timing on the active bank may be retarded from MBT due to operating at higher cylinders loads and protection from borderline limits. However, when used, the level of spark retard used during the VDE mode (as between t1 and t2) would not be as large as the spark retard amount used on the reactivated bank (bank_2) for catalyst heating (as depicted between t2 and t3).

In one example, a method for an engine comprises selectively deactivating one or more engine cylinders and operating active cylinders with EGR. Then, during reactivation, the method includes operating all engine cylinders with split fuel injection until EGR is less than a threshold. The split fuel injection includes a first lean homogeneous intake stroke injection and a second rich stratified compression stroke injection. A split ratio of the split fuel injection is based on one or more of the EGR during the selective deactivation, and an exhaust catalyst temperature during the reactivation. Operating active cylinders with EGR includes operating active cylinders with a fixed percentage of EGR relative to air flow. Operating active cylinders with EGR also includes adjusting an EGR level of the active cylinders based on average cylinder load of the active cylinders during the selective deactivation, the EGR level increased as the average cylinder load increases. Further, during the reactivation, reactivated cylinders are operated with spark timing retard, the retard based on exhaust catalyst temperature.

Thus by operating all engine cylinders with split fuel injection upon cylinder reactivation until an EGR level of the intake system is below a threshold, combustion stability issues associated with high EGR dilution at low cylinder loads can be mitigated. In addition, the use of split injection expedites exhaust catalyst reactivation following the VDE mode of operation, improving exhaust emissions. By further adjusting the split ratio based on an alcohol content of the injected fuel, drivability deterioration from mixed fuel usage is reduced. In particular, poor combustion events that may result in a stumble can be reduced.

In this way, by operating reactivated cylinders with split fuel injection with a portion of fuel delivered during an intake stroke and a portion of the fuel delivered during a compression stroke, restart combustion stability of the cylinders is improved. In particular, combustion stability issues associated with the reduction in cylinder load upon cylinder reactivation can be mitigated. In addition, the split injection expedites exhaust catalyst reactivation following the VDE mode of operation, improving exhaust emissions. By further adjusting the split ratio based on an alcohol content of the injected fuel, drivability deterioration from mixed fuel usage is reduced. In particular, poor combustion events that may result in a stumble can be reduced.

By also operating active cylinders with split fuel injection for a number of combustion events during a VDE mode of engine operation, the temperature and catalytic efficiency of an exhaust catalyst can be rapidly recovered while also improving combustion stability during the transition to a non-VDE mode of operation. By using the split injection to expediate exhaust warming, a duration of engine operation in the VDE mode is prolonged. This allows the fuel economy benefits of cylinder deactivation to be extended. Overall, engine performance is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   selectively deactivating one or more engine cylinders responsive to operating conditions; and
   during reactivation of the cylinders,
      operating the reactivated cylinders with split fuel injection; and
      retarding spark timing in the reactivated cylinders, an amount of spark retard based on an exhaust catalyst temperature.

2. The method of claim 1, wherein operating the reactivated cylinders with split fuel injection includes operating the reactivated cylinders with split fuel injection for a number of combustion events and then resuming single fuel injection.

3. The method of claim 2, wherein operating the reactivated cylinders with split fuel injection includes operating with at least a first intake stroke injection and a second compression stroke injection.

4. The method of claim 3, wherein the first intake stroke injection is a lean homogeneous intake stroke injection and wherein the second compression stroke injection is a rich stratified compression stroke injection.

5. The method of claim 4, wherein a split ratio of the split fuel injection is based on a duration of the selective deactivation, the split ratio adjusted to decrease an amount of the first intake stroke injection while correspondingly increasing an amount of the second compression stroke injection as the duration of selective deactivation increases.

6. The method of claim 5, wherein the split ratio is further based on the exhaust catalyst temperature, the split ratio adjusted to increase the amount of the first intake stroke injection while correspondingly decreasing the amount of the second compression stroke injection as the catalyst temperature falls below a threshold.

7. The method of claim 6, wherein one or more of the split ratio, a timing, and a pressure of the fuel injection is further adjusted based on an alcohol content of injected fuel, the amount of the second compression stroke injection increased and the amount of the first intake stroke injection correspondingly decreased as the alcohol content of the injected fuel increases.

8. The method of claim 1, wherein the split fuel injection is adjusted based on an EGR level of active cylinders during the selective deactivation, the split fuel injection continued until the EGR level during the reactivation is below a threshold EGR rate.

9. The method of claim 1, wherein the number of combustion events is based on an engine load during the cylinder reactivation, the number of combustion events increased until the engine load reaches steady-state conditions.

10. The method of claim 9, wherein the number of combustion events is further based on a duration of selective deactivation, an engine coolant temperature, and an EGR level during the reactivation, the number of combustion events increased as the duration increases, the engine coolant temperature decreases and the EGR level increases.

11. The method of claim 1, further comprising, during the reactivation, operating the already active cylinders with fuel injected for a number of combustion events as a single intake stroke fuel injection.

12. The method of claim 2, further comprising, after the number of combustion events, operating the reactivated cylinders with fuel injected as a single fuel injection in an intake stroke.

13. A method for an engine, comprising:
   selectively deactivating one or more engine cylinders in response to operating conditions; and
   during reactivation, operating reactivated cylinders with fuel injection split into each of an intake stroke injection and a compression stroke injection for a number of combustion events since the reactivation, a ratio of fuel injected in the intake stroke injection relative to the compression stroke injection based on an exhaust catalyst temperature, an amount of fuel injected in the intake stroke injection increased as the exhaust catalyst temperature falls below a threshold.

14. The method of claim 13, wherein selectively deactivating one or more engine cylinders includes deactivating one or more engine cylinders of a first engine bank, the engine including a second bank, and wherein the ratio of fuel injected is based on a temperature of an exhaust catalyst coupled to the first bank and not the second bank.

15. The method of claim 13, wherein the ratio of fuel injected is further based on an alcohol content of the injected fuel, the amount of fuel injected in the intake stroke injection decreased, and an amount of fuel injected in the compression stroke injection correspondingly increased as the alcohol content of the injected fuel increases.

16. A method for an engine, comprising:
   selectively deactivating one or more engine cylinders;
   during a first reactivation, operating reactivated cylinders with fuel injected as a single injection; and
   during a second reactivation, operating the reactivated cylinders with fuel split injected into an intake stroke injection and a compression stroke injection.

17. The method of claim 16, wherein the second reactivation occurs after a longer duration of deactivation while the first reactivation occurs after a shorter duration of deactivation.

18. The method of claim 17, further comprising, during the first reactivation, maintaining spark timing of the reactivated cylinders, and during the second reactivation, retarding spark timing of the reactivated cylinders.

* * * * *